(12) United States Patent
Torgerson

(10) Patent No.: US 8,661,344 B1
(45) Date of Patent: Feb. 25, 2014

(54) SYSTEMS AND METHODS FOR PROVIDING AN INDICATOR OF DETECTION OF INPUT RELATED TO AN ELEMENT OF A USER INTERFACE

(75) Inventor: Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 151 days.

(21) Appl. No.: 13/351,990

(22) Filed: Jan. 17, 2012

Related U.S. Application Data

(63) Continuation of application No. 11/067,536, filed on Feb. 25, 2005, now Pat. No. 8,122,354.

(51) Int. Cl.
*G06F 3/00* (2006.01)
*G06F 3/01* (2006.01)

(52) U.S. Cl.
USPC .......... 715/710; 715/711; 715/780; 715/817; 715/818; 715/859

(58) Field of Classification Search
USPC .................. 715/710, 711, 780, 817, 818, 859
See application file for complete search history.

(56) References Cited

U.S. PATENT DOCUMENTS

| | | | |
|---|---|---|---|
| 5,301,301 A * | 4/1994 | Kodosky et al. | 716/119 |
| 5,617,114 A | 4/1997 | Bier et al. | |
| 5,778,402 A | 7/1998 | Gipson | |
| 5,805,167 A | 9/1998 | van Cruyningen | |
| 5,828,376 A | 10/1998 | Solimene et al. | |
| 5,860,073 A | 1/1999 | Ferrel et al. | |
| 5,940,847 A | 8/1999 | Fein et al. | |
| 5,946,696 A | 8/1999 | Young | |
| 6,002,399 A * | 12/1999 | Haine et al. | 715/763 |
| 6,029,196 A | 2/2000 | Lenz | |
| 6,085,206 A | 7/2000 | Domini et al. | |
| 6,278,450 B1 | 8/2001 | Arcuri et al. | |
| 6,950,831 B2 | 9/2005 | Haley | |
| 7,069,517 B2 * | 6/2006 | Washington et al. | 715/763 |
| 7,100,112 B1 | 8/2006 | Winser | |
| 7,251,782 B1 | 7/2007 | Albers et al. | |
| 7,272,815 B1 * | 9/2007 | Eldridge et al. | 717/101 |
| 7,392,309 B2 * | 6/2008 | Childers et al. | 709/224 |
| 2002/0083073 A1 | 6/2002 | Vaidya et al. | |
| 2002/0113810 A1 | 8/2002 | Radtke et al. | |
| 2002/0167544 A1 | 11/2002 | Raghavan et al. | |
| 2003/0103072 A1 | 6/2003 | Ko | |
| 2003/0117427 A1 | 6/2003 | Haughawout et al. | |
| 2003/0126555 A1 | 7/2003 | Aggarwal et al. | |
| 2003/0149934 A1 | 8/2003 | Worden | |

(Continued)

*Primary Examiner* — Nicholas Augustine
(74) *Attorney, Agent, or Firm* — Nelson Mullins Riley & Scarborough LLP

(57) ABSTRACT

Systems and methods are provided for detecting an action providing input associated with an element of a user interface (UI) and/or graphical model, and providing an indicator to indicate the action has been detected. The UI and graphical model may provide elements that may be editable or otherwise changeable. The action may provide input that may change a value of the editable element of the UI or alter an element of the graphical model. Upon detection of the action, an indicator is provided in the UI or the graphical model in a manner associated with the detected changed element. The indicator may be a visual indicator or any other sensory indicator, such as a sound, force, or tactile indicator. The indicator provides a prompt to a user that one or more elements of the UI or graphical model may need to be saved, applied, or any changes canceled.

30 Claims, 14 Drawing Sheets

(56) References Cited

U.S. PATENT DOCUMENTS

| | | |
|---|---|---|
| 2003/0212740 A1 | 11/2003 | Berrigan et al. |
| 2004/0061716 A1 | 4/2004 | Cheung et al. |
| 2004/0123239 A1 | 6/2004 | Roessler |
| 2004/0158812 A1 | 8/2004 | Dye et al. |
| 2004/0181747 A1 | 9/2004 | Hull et al. |
| 2004/0189708 A1 | 9/2004 | Larcheveque et al. |
| 2004/0215441 A1 | 10/2004 | Orofino et al. |
| 2004/0226002 A1 | 11/2004 | Larcheveque et al. |
| 2005/0052434 A1 | 3/2005 | Kolmykov-Zotov et al. |
| 2005/0198563 A1 | 9/2005 | Kristjansson |
| 2006/0178890 A1* | 8/2006 | Marechal et al. .................. 705/1 |
| 2010/0223593 A1* | 9/2010 | Eldridge et al. .............. 717/105 |

\* cited by examiner

SYSTEMS AND METHODS FOR PROVIDING AN INDICATOR OF DETECTION OF INPUT RELATED TO AN ELEMENT OF A USER INTERFACE

RELATED APPLICATIONS

This Application is continuation of U.S. patent application Ser. No. 11/067,536, which was filed on Feb. 25, 2005. The above-identified application is hereby incorporated by reference in its entirety as though fully set forth herein.

TECHNICAL FIELD

The present invention generally relates to technical computing, and, more particularly, to providing an indicator that an element of a user interface or a graphical model, or a parameter of a graphical modeling environment may have been changed but not applied, canceled or saved.

BACKGROUND INFORMATION

User interfaces, such as graphical user interfaces, present information and functionality to a user for interaction with software. A user interface can interact with a user through a myriad of user interface elements or widgets. Many of these user interface elements receive input from a user through an input mechanism such as a mouse or keyboard. Furthermore, these user interface elements can include a graphical element with a collection of input elements. For example, a tree widget may provide a hierarchy of widgets, where each widget has its own window, dialog or form for interacting with the application. In another example, a set of property sheets may have multiple tabs with each tab handling a portion of user input for the user interface.

Users may interact with user interface elements to modify multiple input elements across multiple forms or screens. For example, a user may change a value of an input element in a first screen, and then the user may navigate to one or more other screens before saving any changes in the first screen. The user may also change input values of input elements in the other screens. In some cases, the user may attempt to change a value of an input element but may not actually apply the change of the value. In other cases, the user may apply the change in value to determine the effect on the functionality of the user interface, but not permanently save the change. As such, the user may perform one or more actions to change the values of input elements before saving, applying, or canceling the changes.

Prior to saving, applying, or canceling any changes to values of input elements in the user interface, the user may need to review such changes to determine if the user desires to save, apply, or cancel the changes. With more and more input elements on the user interface, it is increasingly challenging for a user to determine the input elements that have changed values or that the user may have tried to change. Also, it is further challenging for the user to determine the input related activity of multiple input elements across multiple forms or screens before saving, applying, or canceling any changes made by such activity.

SUMMARY OF THE INVENTION

The present invention provides systems and methods for detecting an action providing input associated with an element of a user interface and/or graphical model, and providing an indicator to indicate the action has been detected. The user interface and graphical model may provide one or more elements that may be editable or otherwise changeable by a user, or by other means, such as programmatically via executable instructions. In the user interface, one or more editable elements may have a current value, such as an initial value or a previously saved value. The graphical model may include one or more elements that may be graphically changed or altered in a graphical modeling environment.

Any actions providing input that may possibly change the value of an editable element of the user interface may be detected. For example, a user via an input device may enter a character into the editable element or may select a value from one or more values provided by the editable element. In another example, a program may via an application programming interface (API) change the value of the editable element. Upon detection of the action, the present invention provides an indicator in the user interface that is associated with the editable element. The indicator identifies that an action to change the value of the editable element has been detected, and that the value of the element may have changed or has changed from its previous value. The indicator may be a visual indicator or may be any other sensory type of indicator, such as an auditory, force or tactile feedback indicator. As such, the indicator provides a prompt to a user that one or more elements of the user interface may need to be saved, applied, or any changes canceled.

Additionally, any action providing input that may alter an element of the graphical model may be detected. The present invention provides an indicator associated with the graphical model to indicate that the action has been detected. For example, an action may be taken to add, modify or delete an element of the graphical model and the indicator indicates that the element may have been added, modified or deleted, or has been added, modified or deleted. For example, a block in a block diagram model may be added and an indicator, visually or otherwise, indicates that the block was added. As such, the indicator provides a prompt to a user that the graphical model or one or more elements of the graphical model may need to be saved or any changes canceled.

In one aspect, the present invention is related to a method for providing an indicator to indicate detection of an action providing input associated with an element of a user interface. The user interface may be graphical or text-based. The input may be associated with a possible change to the value of the element. The method includes the step of providing a user interface with one or more editable elements, detecting an action proving input associated with an editable element, and providing an indicator representing the detection of the action. The indicator is associated with the editable element. Also, the indicator indicates that the detected action has either changed and/or possibly changed the value of the editable element.

In another aspect, the present invention provides an indicator having a font color, font type, a font style and/or a background color distinguishable from a font color, font type, font style and/or background color of the editable element. Also, the indicator may include but is not limited to one or more of the following: 1) a highlight, 2) an animation, 3) a symbol, 4) an alphanumeric character, 5) a sound, 6) a force feedback, and 7) a tactile feedback. Additionally, the indicator may comprise a change to a property of the editable element, such as a change to a font color, font type, font style and/or color of the editable element.

In another aspect of the present invention, the action providing input to the editable element is performed programmatically via executable instruction and/or by a user via an input device. Also, one or more of the editable elements may be 1) a text field, 2) edit box, 3) choose list, 4) combo box, 5) check list, or 6) a radio button. In a further aspect, the step of detecting includes detecting an event associated with an input device, such as a mouse click or mouse down event. The step of detecting may also include detecting the entering of a character into the editable element and/or selecting a value from one or more values provided by the editable element.

In another aspect, the present invention relates to a device readable medium having device readable instructions to execute the steps of the method, as described above, related to a method for providing an indicator to indicate detection of an action providing input associated with possibly changing an element of a user interface.

In a further aspect, the present invention relates to transmitting via a transmission medium computer data signals representing device readable instructions to execute the steps of the method, as described above, related to a method for providing an indicator to indicate detection of an action providing input associated with possibly changing an element of a user interface.

In one aspect, the present invention relates to a method for providing a visual indicator for a first element in a graphical user interface to indicate a detection of an action providing input to one or more elements associated with the first element. The method includes the step of providing a graphical user interface having one or more elements associated with a first element. The one or more elements of the graphical user interface are configured to receive input. The method includes detecting an action providing input to at least one element of the one or more elements, and providing a visual marker associated with the first element to indicate the detection of the action to the at least one element of the one or more elements associated with the first element. Also, the visual marker indicates that the detected action has changed and/or possibly changed the value of the at least one element.

In another aspect of the present invention, the action providing input to the least one element is performed programmatically by executable instruction and/or by a user via an input device. The first element may be 1) a tree widget, 2) a frame widget, 3) a grid widget, 4) a tab widget, and 5) a collection object. The at least one element may be 1) a text field, 2) edit box, 3) choose list, 4) combo box, 5) check list, 6) a radio button, and 7) an editable widget.

In one aspect of the present invention, the one or more elements associated with the first element may represent one or more portions of a graphical model. In another aspect, the step of detecting may include detecting a click event from the at least one element and/or an input focus on the at least one element. In one embodiment, the step of detecting includes detecting a mouse down event from the at least one element.

In another aspect, the visual marker of the present invention includes any one or more of the following: 1) a highlight, 2) an animation, 3) a symbol, 4) an alphanumeric character, 5) a font, and 6) a color distinguishable from the first element. Furthermore, a sound, a force feedback, and/or a tactile feedback may be associated with the visual marker.

In another aspect, the present invention relates to a device readable medium having device readable instructions to execute the steps of the method, as described above, related to a method for providing a visual indicator for a first element in a graphical user interface to indicate a detection of an action providing input to one or more elements associated with the first element.

In a further aspect, the present invention relates to transmitting via a transmission medium computer data signals representing device readable instructions to execute the steps of the method, as described above, related to a method for providing a visual indicator for a first element in a graphical user interface to indicate a detection of an action providing input to on one or more elements associated with the first element.

In another aspect, the present invention relates to a method for providing a visual indicator in a graphical modeling environment to indicate a detection of an action providing input to a graphical model. The input may possibly alter the graphical model. The method includes the steps of providing, in a graphical modeling environment, a graphical model that may be altered, detecting an action providing input to the graphical model, and providing a visual indicator in the graphical model to indicate that the action has been detected. Also, the visual indicator indicates that a portion of the graphical model may have been added, modified or deleted.

In one aspect of the present invention, the action may alter the graphical model and includes adding, modifying, and/or deleting an element of the graphical model. Additionally, the action may be performed programmatically by executable instruction and/or a user via an input device. In another aspect, the visual indicator of the present invention identifies a portion of the graphical model that may have been altered. Additionally, a sound, a force feedback, and/or a tactile feedback may be associated with the visual indicator.

In another aspect, the present invention relates to a device readable medium having device readable instructions to execute the steps of the method, as described above, related to a method for providing a visual indicator in a graphical modeling environment to indicate a detection of an action providing input to a graphical model.

In a further aspect, the present invention relates to transmitting via a transmission medium computer data signals representing device readable instructions to execute the steps of the method, as described above, related to a method for providing a visual, audible, force, and/or tactile indicator in a graphical modeling environment to indicate a detection of an action providing input to a graphical model.

In a further aspect, the present invention relates to a system for providing an indicator to indicate a detection of an action providing input associated with an element of a user interface. The system includes a user interface having one or more elements and a detector to detect an action providing input associated with at least one element of the one or more elements. The system provides an indicator associated with the user interface representing the detection by the detector of the action providing input to the at least one element. In one aspect, any portion of the user interface and/or the detector may execute on a first computing device and/or a second computing device.

In another aspect of the system of the present invention, the action providing input to the at least one element is performed by an executable instruction and/or a user via an input device. Also, the indicator of the present invention indicates that the detected action has changed and/or possibly changed the at least one element. The least one element may be any of the following: 1) a text field, 2) edit box, 3) choose list, 4) combo box, 5) check list, and 6) a radio button. Also, the indicator may be associated with a first element that is associated with the one or more elements.

In a further aspect, the graphical user interface of the present invention may represent a graphical model, and the one or more elements represent one or more portions of the graphical model. In one aspect, the detector detects an action to alter the graphical model and in another aspect, the detector detects an action to change a value of an editable portion of the least one element.

In yet another aspect, the system of the present invention provides the indicator having a font, a color, a highlight, an animation, a symbol, and/or an alphanumeric character distinguishable from the at least one element. Also, the indicator may include a sound, a force feedback, and/or a tactile feedback.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
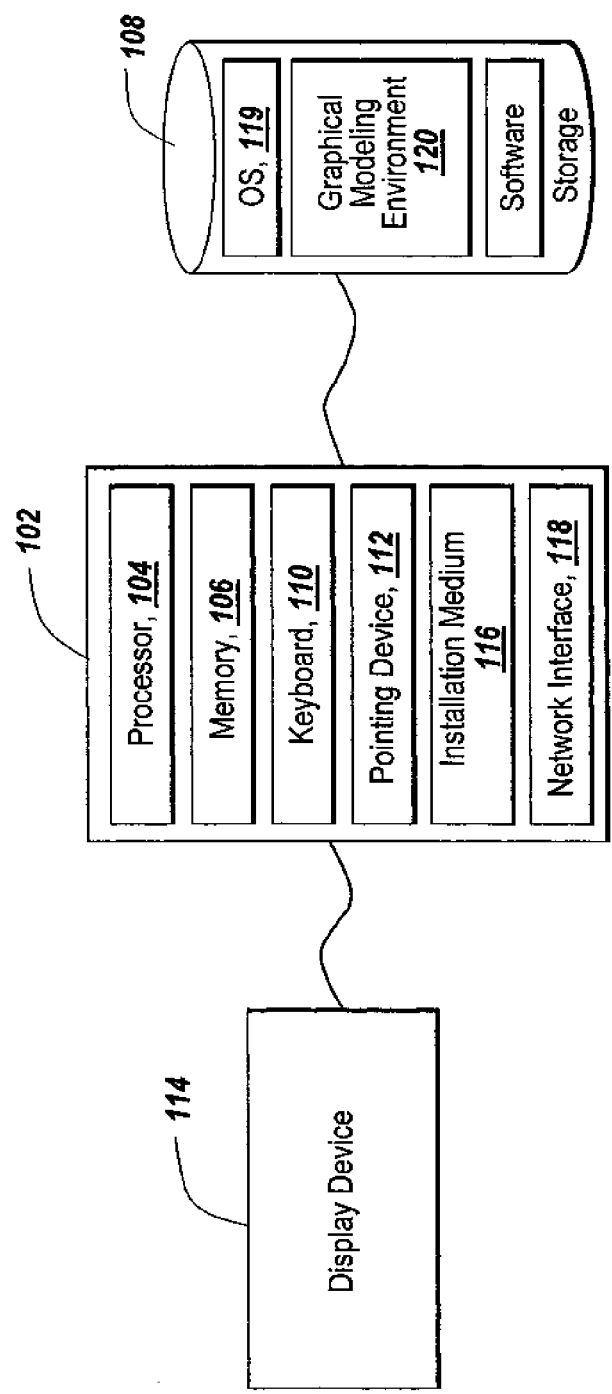
FIG. 1 is a block diagram of an illustrative computing device for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not expressly made herein, without departing from the spirit and scope of the invention.

The illustrative embodiment of the present invention provides systems and methods for detecting an action providing input to an element of a user interface and/or graphical model, and providing an indicator to indicate the action has been detected. A user interface, such as a graphical user interface, may provide one or more elements that may be editable by a user or by other means, such as programmatically via executable instructions. One or more editable elements may have a current value, such as an initial or default value, or no value. In other cases, the editable element may have a value from a persistent storage holding the current value for the editable element.

In an illustrative embodiment, the present invention detects any actions to provide input associated with an editable element of the user interface, including any actions that change or may change a value of the editable element. For example, a user via an input device may enter a character into the editable element or may select a value from one or more values provided by the editable element. In another example, a program via an application programming interface (API) may perform an action to change the value of the editable element. Upon detection of the action, the present invention provides an indicator in the user interface that is associated with the editable element. The indicator identifies that an action providing input associated with the editable element has been detected, and that the value of the element may have changed or has changed from its previous value. The indicator may be a visual indicator or may be any other type of sensory indicator, such as an indicator that provides audio, force, or tactile feedback.

The indicator may also be referred to as a "dirty" indicator. In this aspect, the dirty indicator indicates that the modifiable or editable element may have changed or has changed since it was last saved. That is, the indicator indicates that there is not any assurance that the value of the modifiable/editable element has remained static from the value provided for the element when the user interface was presented, or from the previously saved, applied or otherwise previously used value for the element. As such, the dirty indicator provides a prompt to the attention of a user to determine whether the element should be saved, applied, or canceled, such as before closing, exiting or otherwise leaving the user interface.

The system and methods of the present invention can also be applied to graphical user interfaces with a user interface element that contains a group or set of other elements. For example, a container widget, such as a tree or tab type widget, may group together a set of one or more editable elements. The present invention detects an action providing input associated with an element of the container widget, such as an action to change a value of the element, and provides an indicator associated with the container widget to indicate the action has been detected on one or more elements of the container widget. As such, the indicator provides a prompt to a user that one or more elements of the container widget may need to be saved, applied, or the changes canceled.

Furthermore, the system and methods of the present invention can also be applied to a graphical model. For example, a graphical model, such as a block diagram model, can be provided in a graphical modeling environment. The graphical model may have been previously saved to memory and/or storage. The present invention detects an action to provide input to the graphical model, such an action that may alter an element of the graphical model, and provides an indicator associated with the graphical model to indicate that the action has been detected. An action may be performed to add, modify or delete the element of the graphical model and the indicator indicates that the element has or may have been added, modified or deleted. For example, a block in a block diagram model may be added and an indicator, visually or otherwise, indicates that the block was added. As such, the indicator provides a prompt to a user that the graphical model or one or more elements of the graphical model may need to be saved, applied, or any changes canceled.

Additionally, the systems and methods of the present invention can be applied to formatted text, such as variables or parameters, for example, the workspace variables of an illustrative embodiment of the graphical modeling environment. Actions may be detected via a user interface and/or graphical model that changes one or more variables associated with a workspace of the graphical modeling environment. In accordance with the present invention, an indicator associated with the variable may be provided to indicate that the variable or any attributes or properties of the variables has changed or may have changed.

The illustrative embodiment will be described solely for illustrative purposes relative to a user interface, graphical model, and modeling environment provided by the software products from The MathWorks, Inc. of Natick, Mass. Although the illustrative embodiment will be described relative to a MATLAB® and/or Simulink®-based application, one of ordinary skill in the art will appreciate that the present invention may be applied to other user interfaces, graphical models and modeling environments, including state-based and flow diagram environments, data flow diagram environments, electronic design automation (EDA) environments, and Unified Modeling Language (UML) environments, such as any environments using software products of LabVIEW® or MATRIXx from National Instruments, Inc., MSC.Adams® from MSC.Software Corporation of Santa Ana, Calif., Virtuoso from Cadence of San Jose, Calif., Dymola from Dynasim AB of Lund, Sweden, Rational Rose from IBM of White Plains, N.Y., Mathematica® from Wolfram Research, Inc. of Champaign, Ill., Mathcad from Mathsoft Engineering & Education Inc., or Maple™ from Maplesoft, a division of Waterloo Maple Inc.

FIG. 1 depicts an environment suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may comprise a computer system memory or random access memory such as DRAM, SRAM, EDO RAM, etc. The memory 106 may comprise other types of memory as well, or combinations thereof. A human user may interact with the computing device 102 through a display device 114 such as a visual display device, a tactile display device, a haptic display device, a force feedback display device, any type of sensory or multi-sensory display device, or any combination thereof. For example, the display device 114 may be a computer monitor, which may be used to display a graphical user interface (GUI).

The computing device 102 may include other I/O devices such a keyboard 110 and a pointing device 112, for example a mouse, for receiving input from a user. Optionally, the keyboard 110 and the pointing device 112 may be connected to the visual display device 114. Additionally, the computing device 102 may include any type of input device for receiving user input, such as a joystick. In other embodiments, the computing device 102 may include any type of haptic device, such as a vibration generating mouse or force feedback joystick. Also, the computing device 102 may include any type of sound producing I/O device such as any suitable sound card. The computing device 102 may include other suitable conventional I/O peripherals.

For installing software programs, the computing device 102 may support any suitable device readable medium 116, such as a CD-ROM, DVD-ROM floppy disks, tape device, USB device, hard-drive or any other suitable device. The computing device 102 may further comprise a storage device 108, such as a hard-drive or CD-ROM, for storing an operating system 119 and other related software. The present invention of a graphical modeling environment 120 may comprise software that is installed via a device readable medium 116 and stored in the storage device 108. Additionally, the operating system 119 and graphical modeling environment 120 can be run from a bootable CD, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, notebook, handheld computer or other form of computing or telecommunications device that is capable of communication and that has sufficient processor power and memory capacity to perform the operations described herein.

Figure 2A:
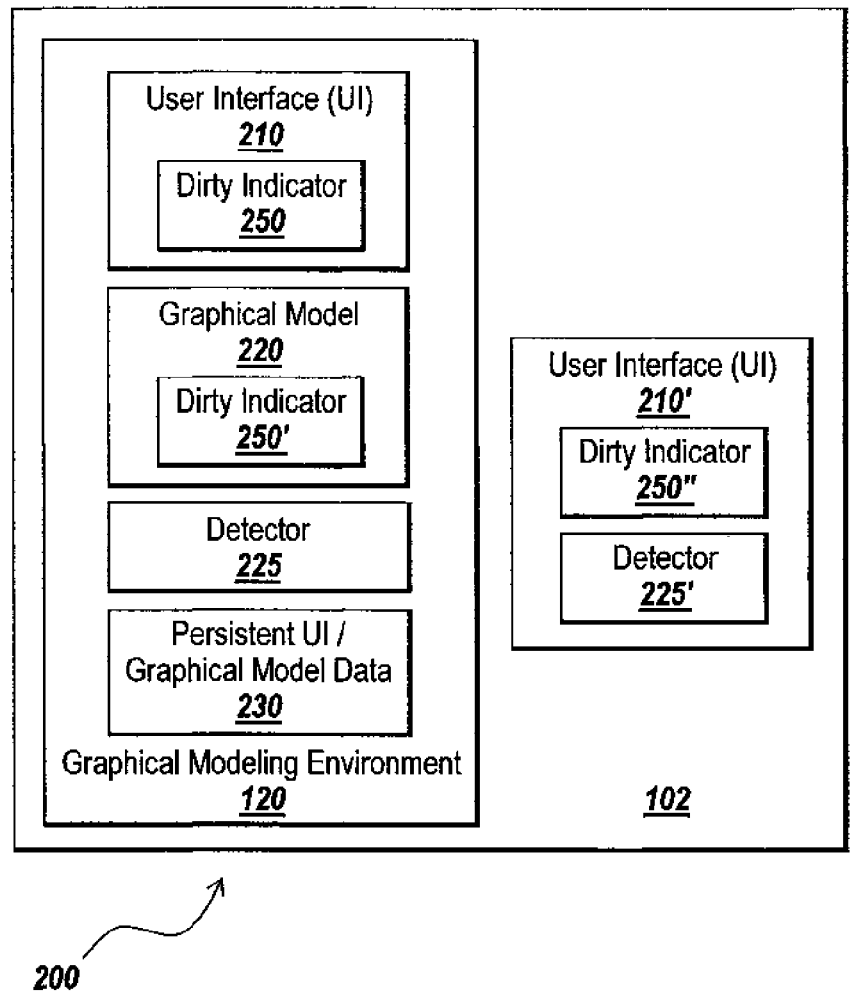
FIG. 2A is a block diagram of an illustrative graphical environment for practicing an embodiment of the present invention on the computing device of FIG. 1.

In one aspect, the present invention is related to a graphical modeling environment 120 as illustrated in the system 200 of FIG. 2A. In brief overview, the system 200 includes an illustrative graphical modeling environment 120 having an environment for providing a user interface 210 and/or graphical model 220. The graphical modeling environment 120 also includes a detector 225, which is a mechanism for detecting actions to change any portion of the user interface 210 and/or graphical model 220 and for providing a dirty indicator 250 upon detecting of such actions. The user interface 210 and/or graphical model 220 may be associated with a persistent storage of data 230 associated with elements of the user interface 210 and/or graphical model 220.

In an exemplary embodiment, the graphical modeling environment 120, such as a graphical modeling environment like Simulink® from The MathWorks, Inc. of Natick, Mass., provides a graphical and interactive environment by which users can create, modify and save user interfaces, such as graphical user interfaces, and graphical models, such as block diagram models. The graphical modeling environment 120, and any portion thereof, can comprise an application, module, service, computer program, software component, library, or any other type of executable instruction which is designed to and capable of executing the functionality of the graphical modeling environment 120 as described herein. Additionally, the graphical modeling environment 120 may be configured to and capable of running any of the modules, libraries or software components of the MATLAB® and/or Simulink® product family. As such, the graphical modeling environment 120 may have all or a portion of the software components of MATLAB® and/or Simulink® installed on the computing device 102, or alternatively, accessible from another computing device 102' on a network.

The user interface 210 of the present invention may be any type of user interface, such as text based user interface or a graphical user interface. In some embodiments, the user interface 210 may comprise a command line interface or a command line user environment as known by those ordinarily skilled in the art. In another embodiment, the user interface 210 may be a command line shell for the graphical modeling environment 120, such as the MATLAB® command line user environment for a MATLAB® technical computing environment 120. In other embodiments, the user interface 210 may be any type of text editor, such as text type editors for word processing, script writing, and or programming.

The user interface 210 of the present invention may comprise any type and/or form of graphical user interface. In some embodiments, the user interface 210 may be included in any type of client program in a client/server or distributed system. In other embodiments, the user interface may comprise any type of web page or Internet based application, such as a user interface implemented with a Hypertext Markup Language (HTML) or any other markup language. Additionally, the user interface 210 may comprise any elements, widgets, or components to receive input from a user or otherwise to receive input programmatically from other sources. For example, the user interface 210 may comprise widgets such as a text field, edit box, choose list, combo box, check list, and a radio button.

Furthermore, the user interface 210 may comprise any type of container widgets holding, grouping, organizing, or otherwise associating one or more widgets with the container widget as one ordinarily skilled in the art will appreciate. In some embodiments, a container widget may comprise a tree widget, a frame widget, a grid widget, a tab widget, a collection object or any custom widget or object. The container widget may group or otherwise associate one or more other elements, such as a text field, edit box, choose list, combo box, check list, and a radio button. One ordinarily skilled in the art will recognize and appreciate the multitude of types and forms of graphical user interfaces and the elements for receiving input thereof.

Additionally, the user interface 210 of the present invention may have at least one element of the user interface 210 that is editable, or otherwise changeable. The editable element of the user interface 210 may be changed via any type and/or form of input. In one embodiment, a user may via any type of input device take an action to change the value of the editable element. In another embodiment, the user interface 210 may be changed programmatically from any type and/or form of executable instructions. For example, a set of program instructions may be executed that execute an application programming interface (API) to set or change the value of the editable element of the user interface 210. One ordinarily skilled in the art will recognize and appreciate the myriads of elements of user interfaces, such as editable elements, and the ways these elements may be manipulated to set or change a value associated with the element.

In FIG. 2A, one user interface 210 is illustrated with the graphical modeling environment 210 and another user interface 210' is provided stand-alone on the computing device 102. The graphical modeling environment 120 may provide means and mechanisms to design, develop and/or execute the user interface 210. As such, in some embodiments, the user interface 210 may be presented, displayed, or otherwise shown to users in the context of the graphical modeling environment 120. In other embodiments, the user interface 210 may be a form of executable instructions that can be executed, called, or otherwise initiated in the environment provided by the computing device 102. Although the user interface 210 of the present invention may generally be discussed in relation to the graphical modeling environment 210, one ordinarily skilled in the art will recognize and appreciate that the user interface 210 may be executed and displayed by any suitable means and/or mechanisms in a multitude of different environments.

The graphical model 220 of the present invention as depicted in FIG. 2A can comprise any type and/or form of graphical model 220. The graphical modeling environment 120 may provide any type of tools, libraries and configuration mechanisms to graphically create and/or edit a graphical model 220. In an exemplary embodiment, the graphical model 220 may comprise a block diagram model provided by the Simulink® environment of The MathWorks, Inc. For example, the block diagram model 215 may comprise a series of different type of blocks arranged in a desired manner and connected via connection lines to represent signal values traversing the blocks. The graphical model 220 may comprise any type of element to form a graphical model, such as connectors, blocks, or any other graphical form and representation of functionality supported by the graphical modeling environment 120. One ordinarily skilled in the art will recognize and appreciate the various forms of graphical models, and the elements and content thereof.

For the illustrated user interface 210 and graphical model 220 of the present invention, persistent data storage 230 may hold any values associated with any elements of the user interface 210 or graphical model 220. In one embodiment, the data storage 230 may hold the last entered value or last selected value of an editable element of the user interface 210. For example, the data storage 230 may comprise the last value saved by the user, such as a string entered in a text edit box. In another embodiment, the data storage 230 may store the last saved version or copy of the graphical model 220 saved by the user or the graphical modeling environment 120.

The data storage 230 may comprise any suitable means and/or mechanism for storing data. In some embodiments, the data storage 230 may comprise any type of database, file system, file(s), or any other type and form of storage location capable of storing data. In other embodiments, the data storage 230 may comprise data in any form held in memory. For example, the data storage 230 may comprise a variable, object, and/or data structure holding a value associated with the editable element of the user interface 210 and/or graphical model 220. One ordinarily skilled in the art will recognize and appreciate the many forms of the data storage 230 for storing a value for an editable element of a user interface 210, or a copy or version of the graphical model 220.

In one embodiment, the data storage 230 may only store data in a manner persistent with the execution, and or active use of a user interface 210 or graphical model 220. For example, the user interface 210 may use a variable, data structure, or object as data storage 230 that is initialized upon execution of the user interface 210, such as upon loading a form of a graphical user interface. In this case, the data storage 230 may hold a value for an editable element, such as a last saved or previously saved value, only during the execution of the form of the graphical user interface 210. In other embodiments, the data storage 230 holds a value for the user interface 210 persistently after the execution of the user interface 210. For example, the last saved value of an editable element of a user interface 210 may be stored in a database 230, such as a relational SQL database. The user interface 210 upon initialization or execution may retrieve the last stored value from the database 230 to populate the value of the editable element of the user interface. One ordinarily skilled in the art will recognize and appreciate the various ways that data associated with the user interface 210 and/or graphical model 220 may be persistently stored, either temporary with or in between uses of the user interface 210 and/or graphical model 220.

The detector 225 of the present invention may be included in the graphical modeling environment 120 or separately as part of the user interface 210. With respect to a user interface 210, the detector 225 comprises a mechanism for detecting any type of action to manipulate, alter, enter, select, or otherwise change an editable element of the user interface 210. The detector 225 may use any events associated with the keyboard 110 and/or pointing device 112 of the computing device 102 to determine that an action has been attempted or an action has been taken to change the editable element. In some embodiments, the detector 225 may use any keyboard or mouse event such as any mouse click related events or key press related events available by the operating system of the computing device 102, the graphical modeling environment 120, or the user interface 210. In other embodiments, the detector 225 may use any application programming interfaces (API) of the operating system, and API hooks into the operating system to get notice of any input related events and/or to intercept any input related events.

Additionally, the detector 225 may use any events associated with the editable element of the user interface 210 to determine that an action has been attempted or an action has been taken to change the editable element. In some embodiments, the detector 225 may use any events provided by the control or object used to implement the editable element of the user interface 210. For example, the detector 225 may use a mouse over event, an update event, a change event or any other event provided by a widget control, such as a text box, combo box or radio button widget, that may indicate an action associated with changing or the possibility of changing the editable element. In some embodiments, the editable element of the user interface 210 may be grayed out, locked, disabled or otherwise configured to prevent the element from being changed or otherwise manipulated. Nevertheless, in some embodiments, the detector 225 may detect any action to attempt to change to such a configured element.

With respect to a graphical model 220, the detector 225 comprises a mechanism for detecting any type of action to manipulate, add, modify, change, delete, or otherwise alter a graphical model 220 or any portion thereof. The detector 225 may use any pointing device 112 events, such as mouse events, and/or keyboard 110 events provided by the graphical modeling environment 120 when a graphical model 220 is manipulated or altered. In the graphical modeling environment 120, a graphical model 220 may be created and edited by dragging and dropping elements of the graphical model 220. As such, in some embodiments, the detector 225 may detect any drag and drop events related to altering the graphical model 220. For example, a user may add a new block to a block diagram model 220 by dragging and dropping a block from a library of blocks. In another example, a user may select, drag and drop a block in a block diagram model to move or position the block to another location.

In the exemplary embodiment of Simulink® as the graphical modeling environment 120, the graphical model 220 comprises a block diagram model. The Simulink® graphical modeling environment 120 provides various mouse and keyboard actions known by one ordinarily skilled in the art to manipulate a block diagram model 220, such as for manipulating blocks, lines, signal labels and annotations. For example, a user may select a block or a line of a block diagram model 210 by clicking the left mouse button. A block may be disconnected by pressing the shift key and dragging the block. A block or a line may be selected by clicking the left mouse button over the block or the line. A signal label may be created by double-clicking on the signal line, and an annotation by double-clicking in the block diagram model 220. As such, the detector 225 can detect any of the pointing device and/or keyboard actions related to graphical modeling to determine if an action has been taken to alter the graphical model 220.

Furthermore, the graphical modeling environment 120 may provide an application programming interface (API), command line interface, or any other type of interface to programmatically alter the graphical model 220. In the exemplary embodiment of Simulink®, the graphical modeling environment 120 provides a set of model construction commands that may be executed in a MATLAB® program. For example, the model construction commands of Simulink® provide commands to add and delete blocks, lines (signals) and parameters and to set parameters of a block diagram model 210. One ordinarily skilled in the art will recognize and appreciate that the graphical modeling environment 120 may provide a variety of instructions via any type of interface to programmatically alter a graphical model 220.

In one aspect of the present invention, a dirty indicator 250 is provided in the user interface 210 upon detection by the detector 225 of an action to change an element, such as an editable element, of the user interface 210. The dirty indicator 250 indicates that the action has been detected. The dirty indicator 250 also can indicate that the value of the editable element may have changed or has changed from the value of the element presented when the user interface 210 was initially presented, or from the last saved value for the editable element. As such, the dirty indicator 250 provides a prompt to the attention of a user to determine whether the element should be saved, such as before closing, exiting or otherwise leaving the user interface 210.

Likewise, a dirty indicator 250' is provided in the graphical model 220 upon detection by the detector 225 of an action to alter a portion of the graphical model 220. The dirty indicator 250 indicates that the action has been detected, and can also indicate that the graphical model 220 may have changed or has changed from the version presented when the graphical model 220 was initially presented, or from the last saved version of the graphical model 220. The dirty indicator 250 is associated with the element of the graphical model 220 that has been altered to indicate to the user the detected altered portion of the graphical model 220. As such, the dirty indicator 250 provides a prompt to the attention of a user to determine whether the graphical model 220 should be saved, such as before closing, exiting or otherwise leaving the graphical model 220 or the graphical modeling environment 210, or before leaving any specific user interface modal or form in the graphical modeling environment 210 to effectively cancel the changes.

The dirty indicator 250 of the present invention may be any type and form of visual, auditory, force, or tactile indicator. In some embodiments, the dirty indicator 250 may comprise a visual indicator that is visually distinguishable from the editable element. An editable element of the user interface 210 may have a certain font (type, style, etc.) along with a certain color such as a foreground, background and/or text color. In one embodiment, the dirty indicator 250 may comprise a visual indicator having a font or a color different than the font and color of the editable element. In other embodiments, the dirty indicator 250 may comprise a visual indicator having a symbol and/or any set of alphanumeric characters. In yet other embodiments, the dirty indicator 250 may comprise any type or form of highlights, animation and/or text effects, such as the highlight or shimmering of text associated with the editable element, for example, the text label of a radio button. In further embodiments, the dirty indicator 250 may comprise any form of graphical element, such as a rectangular box displayed around or otherwise bounding the editable element. One ordinarily skilled in the art will recognize and appreciate the wide variety and combinations of visual indicators that may be used in practicing the present invention as described herein.

The dirty indicator 250 may also comprise any auditory, force, and/or tactile feedback either with or without a visual indicator. In some embodiments, any type of sound may be used as the dirty indicator 250. For example, a bell or ringing sound may be used as the dirty indicator 250. In another example, any type of musical related notes, tunes or portions of music, such as the ring tones associated with a cellular phone, may be used. In a further example, a computer generated or a human recorded voice may be used to provide the dirty indicator 250. Additionally, the dirty indicator 250 may comprise any touch sensory output from any type of haptic device, such as a vibration generating mouse, joystick or other input device. In other embodiments, the dirty indicator 250 may be any type of output produced by any accessibility feature, such as those for users with any type of impairment or disability, of the operating system, graphical modeling environment 120, user interface 210, or any other software and/or hardware of the computing device 102. One ordinarily skilled in the art will appreciate the various types and forms of sensory feedback that may be used in practicing the present invention as described herein. Additionally, one ordinarily skilled in the art will further appreciate that any combination of visual, auditory, force, and tactile indicators may also be used for the dirty indicator 250.

In some embodiments, the graphical modeling environment 210 and/or user interface 210 are configurable to indicate the type of indicator 250 desired, such as a visual, auditory, force, or tactile indicator. In some embodiments, for each type of indicator 250 configured, the form of the indicator 250 may also be configurable. For example, a user may be able to select the desired visual indicator 250, such as a symbol, graphic, highlight, font, box, etc. In another example, the user may able to specify the sound to be used for an auditory type indicator 250. In other embodiments, the user may be able to further configure the type and form of indicator on an element by element basis for either a user interface 210 and/or graphical model 220. One ordinarily skilled in the art will recognize and appreciate the various ways the types and forms of dirty indicators may be configured or otherwise specified in practicing the operations of the present invention described herein.

In another aspect, the dirty indicator 250 is provided in a manner associated with the portion of the user interface 210 or graphical model 220 that the detector 225 has detected an action to change or alter. In the embodiments of a user interface 210, the dirty indicator 250 may be provided adjacent, near or proximate to the editable element from which an action to change was detected. For example, a visual indicator 250, such as a highlighted box, may be displayed around the editable element. In another embodiment, a visual indicator 250 of a symbol such as an "*" may be placed next to any text associated with the editable element of the user interface 210. In another embodiment, a visual indicator 250 in a graphical model 220, such as a block diagram model 215, may be placed next to an altered block or line of the graphical model 220. For example, an added line or block of a block diagram model 220 may be highlighted with a box surrounding the added line or block.

In other embodiments, auditory, force, and tactile type dirty indicators 250 may be associated with the changed portion of the user interface 210 or graphical model 220. In some embodiments, the auditory, force, and tactile indicator 250 may be provided each time there is an event with respect to navigating the user interface 210 or graphical model 220 by the user. For example, each time there is a mouse over event from a changed element of a user interface 210 or graphical model 220, the auditory, force, and/or tactile indicator 250 may be provided. In another example, the auditory and/or tactile indicator 250 may be provided each time the user interface 210 or graphical model 220 has input focus, such as navigating to the user interface via a menu or tab selection, or restoring a minimized screen, or when input focus occurs on the changed element. Furthermore, the frequency of the auditory and tactile feedback as a dirty indicator 250 may be configurable. In some embodiments, an auditory and/or tactile indicator 250 may continually be executed, with or without pauses or breaks, until an action is taken to remove the indicator 250. In other embodiments, the auditory, force, and/or tactile indicator 250 may be provided only once. One ordinarily skilled in the art will recognize and appreciate the various ways an auditory and/or tactile type of the dirty indicator 250 of the present invention may be associated to the changed portion of the user interface 210 or graphical model 220.

Figure 2B:
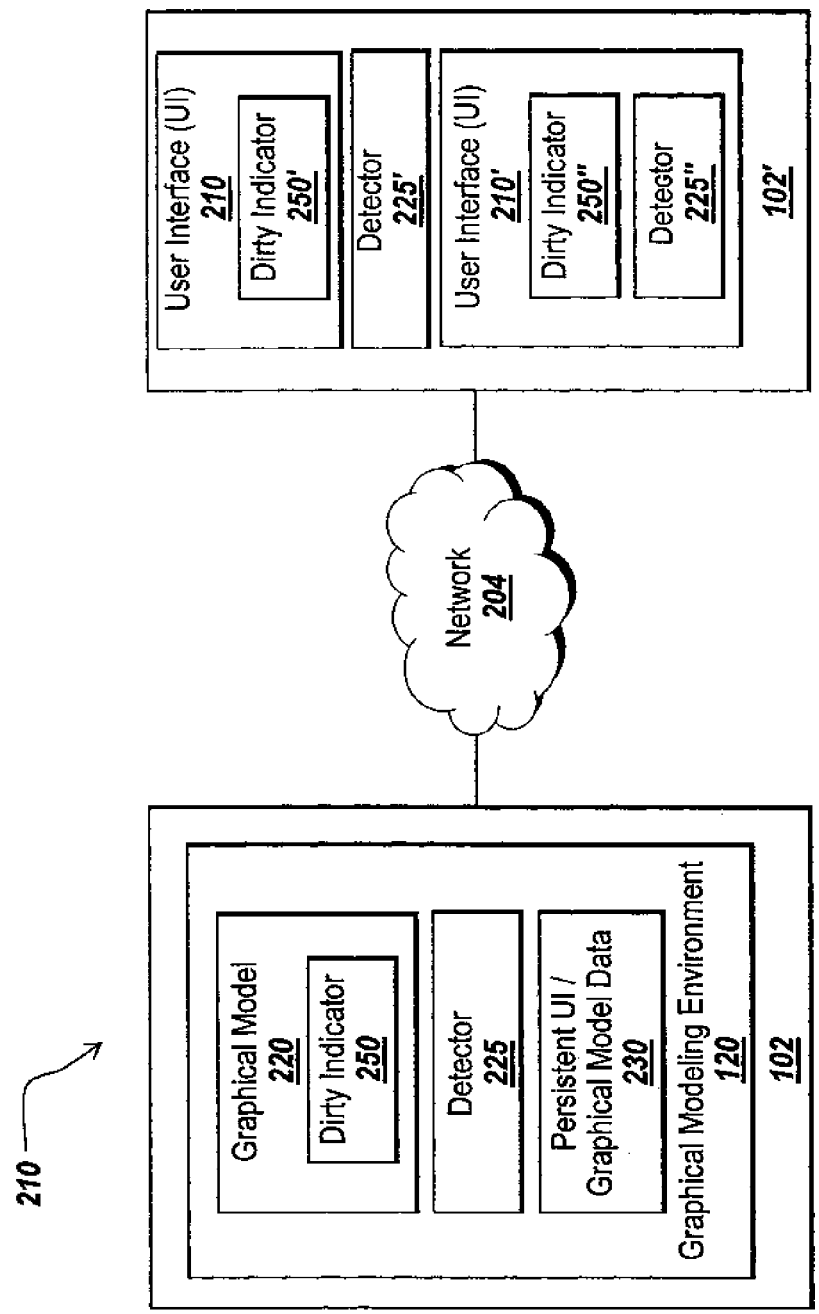
FIG. 2B is a block diagram of another illustrative graphical environment for practicing an embodiment of the present invention in a distributed manner.

FIG. 2B depicts another environment suitable for practicing an illustrative embodiment of the present invention, wherein portions of the present invention are distributed in a network environment. In a broad overview, a system 210 depicts a network 204 environment for running a graphical modeling environment 120 and one or more user interfaces 210, 210' of the present invention. The system 210 includes multiple computing devices 102, 102' connected to and communicating over a network 204. The network 204 can be a local area network (LAN), such as a company Intranet, a metropolitan area network (MAN), or a wide area network (WAN) such as the Internet. In one embodiment (not shown), the network 204 comprises separate networks, which may be of the same type or may be of different types. The topology of the network 204 over which the computing devices 102, 102' communicate may be a bus, star, or ring network topology. The network 204 and network topology may be of any such network 140 or network topology capable of supporting the operations of the present invention described herein.

The computing devices 102, 102' can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

The network 204 and network connections may include any transmission medium between any of the computing devices 102, 102' such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission that is transmitted over the transmission medium, or via any other form of transmission, which may be received, loaded into, and executed, or otherwise processed and used by a computing device 102 to practice the present invention as described herein.

Each of the computing devices 102, 102' may be configured to and capable of running the graphical modeling environment 120 and/or the user interface 210, 210'. The graphical modeling environment 120 and/or the user interface 210, 210' can be capable of and configured to operate on the operating system that may be running on any of the computing devices 102, 102'. Each computing device 102, 102' can be running the same or different operating systems. Additionally, the graphical modeling environment 120 and user interfaces 210, 210' can be capable of and configured to operate on and take advantage of different processors of any of the computing devices 102, 102'. One ordinarily skilled in the art will recognize the various combinations of operating systems and processors that can be running on any of the computing devices. In summary, the graphical modeling environment 120 and user interfaces 210, 210' may be deployed across a wide range of different computing devices, different operating systems and different processors in various network topologies and configurations.

As depicted in FIG. 2B, the detector 225 of the present invention may be deployed as part of the graphical modeling environment 120 or the user interface 210'. Additionally, the detector 225' may be deployed separately from the graphical modeling environment 120 or the user interface 210'. In one embodiment, the detector 225' may be used by more than one user interface 210, such as multiple web pages. In other embodiments, the detector 225' may communicate over the network 225 to the graphical modeling environment 120 or to other software on the computing device 102 to practice the operations of the present invention described herein. For example, the user interface 210 on computing device 102' may be a thin-client type user interface, such as one provided by a remote display protocol, for example, the Remote Desktop Protocol manufactured by Microsoft Corporation of Redmond, Wash., or any other similar thin client software. As such, keyboard and mouse actions may be transmitted or exchanged between computing devices 102 and 102' over the network 204.

In some embodiments, the detector 225" may communicate with any software on computing device 102, such as the data storage 230 for the user interface 210' to practice the operations of the present invention. In one embodiment, the user interface 210' on computing device 102' may present a web page provided by any web related application software running on computing device 102. For example, a graphical model 220 of the graphical modeling environment 120 may be displayed on computing device 102', such as in user interface 210, for editing, altering or manipulation by a user of computing device 102'. One ordinarily skilled in the art will recognize and appreciate the various ways a user interface 210 and graphical model 220 may be deployed and distributed, and how the detector 225, 225', 225" may be used in such deployments to practice the operations of the present invention described herein.

Figure 3A:
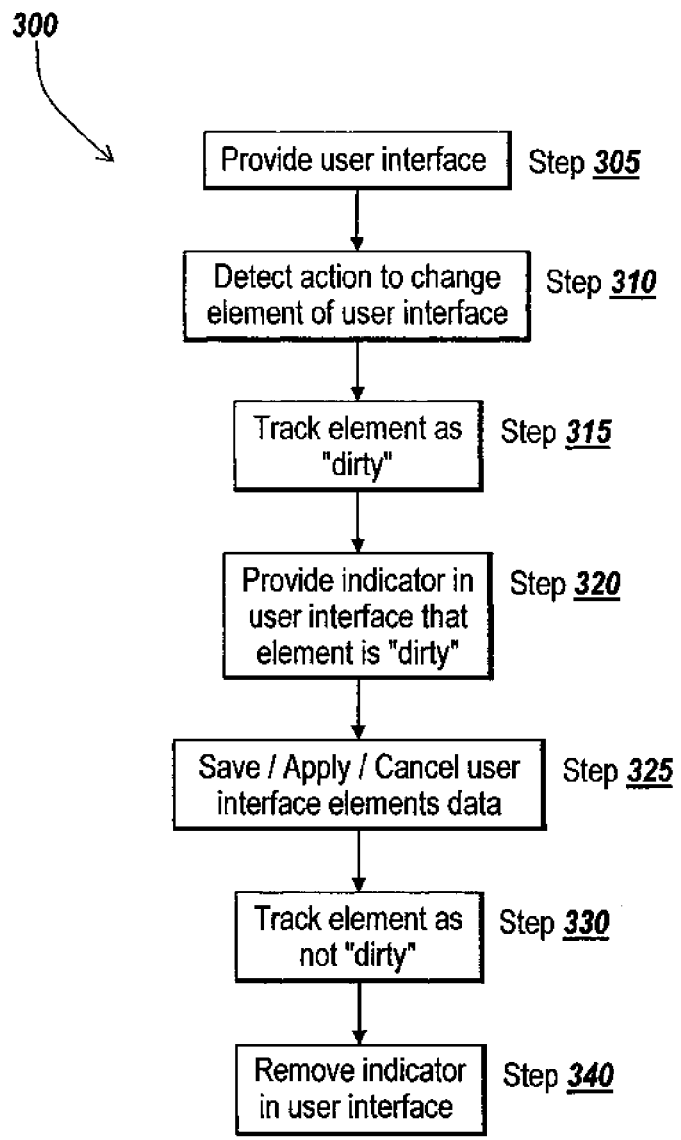
FIG. 3A is a flow diagram depicting an illustrative method for practicing an embodiment of the present invention with the illustrative graphical user interfaces of FIGS. 4A and 4B.

FIG. 3A depicts an illustrative method 300 of practicing the techniques of the present invention in conjunction with a user interface 210 and the illustrative embodiment of FIGS. 2A and 2B. Additionally, the steps of the illustrative method 300 will be discussed in relation to illustrative graphical user interfaces 210 of the present invention depicted in FIGS. 4A, 4B and 4C.

Figure 4A:
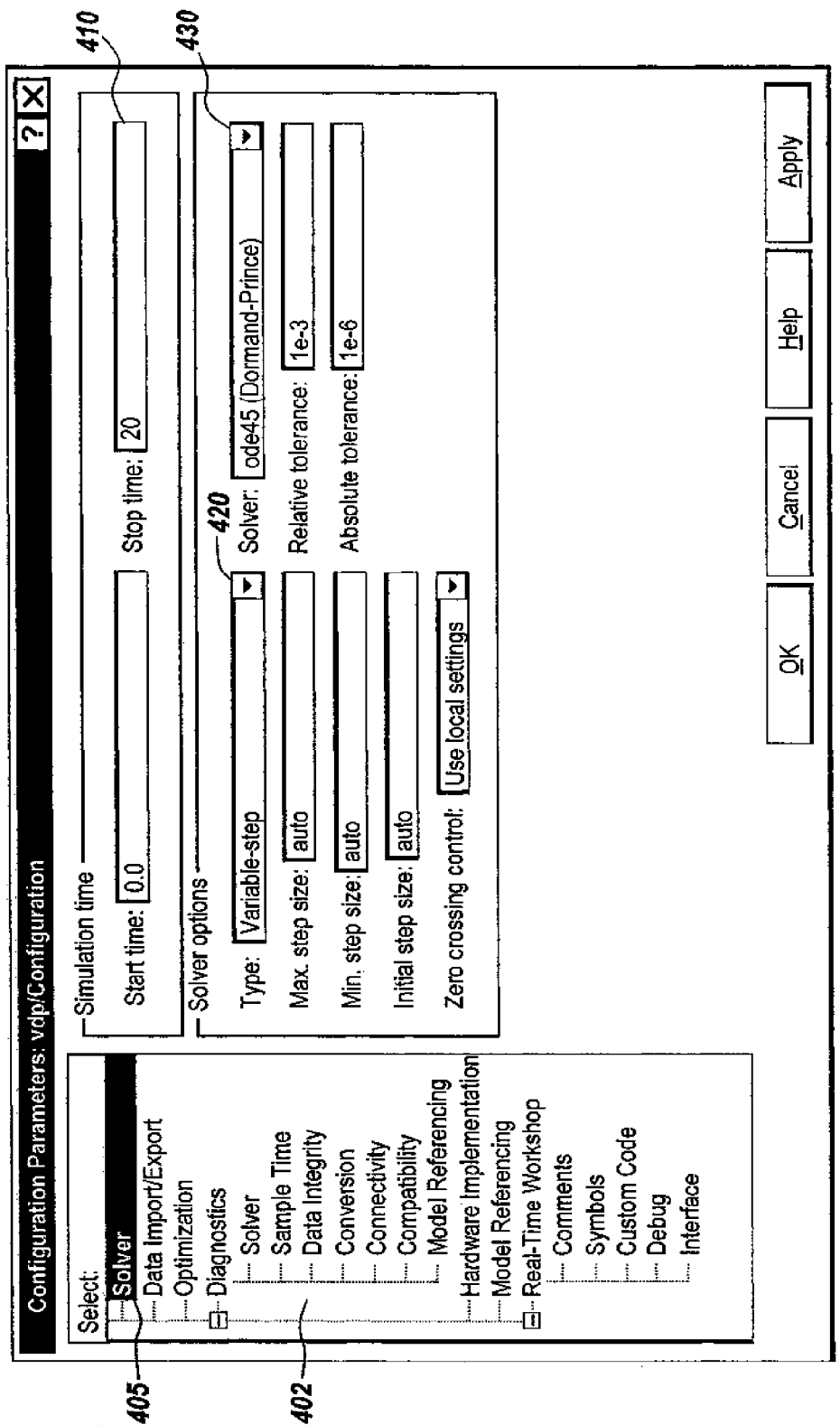
FIGS. 4A and 4B are diagrammatic views of an illustrative graphical user interface for practicing an embodiment of the present invention.

At step 305 of illustrative method 300 of the present invention, a user interface 305 is provided, such as the graphical user interface 210 of FIG. 4A. In brief overview, the illustrative graphical user interface 210 of FIG. 4A comprises a multiple form and multiple element user interface. The tree widget 402 on the left side of the graphical user interface 210 comprises a mechanism for navigating multiple forms displayed on the right side of the user interface 210. In the illustrated example of FIG. 4A, the solver 405 element labeled "Solver" is selected from the tree widget 402 and the Solver 405 related user interface elements are presented on the right side of the user interface 210. By way of example, the user interface 210 has a text field element 410 for entering the stop time for simulation, and is set to an initial or previously saved value of "20". Additionally, the user interface 210 has a solver type combo-box element 420 and a solver name combo-box element 430 for selecting the type and name of the solver. The solver type combo-box 420 may be set to an initial or last saved value of "variable-step", and the solver name combo-box 430 value "ode45-Dormand-Prince". As such, elements 410, 420 and 430 are editable user interface elements that may be changed either programmatically or by a user. Although illustrated with a tree widget and text and combo-box elements, one ordinarily skilled in the art will recognize that any type of user interface elements and/or container type widgets may be used.

At step 310 of the illustrative method 300, an action to change an element of the user interface 210 is detected. In an exemplary embodiment, a detector 225 associated with the user interface 210 detects an action to change any of the editable elements of the user interface 210, such as elements 410, 420 and/or 430. For example, a user may have placed the pointer over the stop time text field element 410, clicked the mouse to place input focus on the field 410, and entered via the keyboard 110 one or more characters, such as numbers into the field 410. In the illustrative example depicted in FIG. 4B, the value of the stop time text field was changed from "20" to "1000". The detector 225 may have detected one or more of the user activities to determine that an action was taken to change the text field 410. In some embodiments, one or more executable instructions, such as a program, may have been executed to take an action to change the value of the text field 410. In one embodiment, the executable instructions may simulate the same activity from the user in changing the text field 410. In another embodiment, the detector 225 may detect the actions by the executable instructions to change the value of the text field 410.

In another embodiment, the illustrative step 310 may detect the action to change the value of the editable element even if the value is not changed or is changed to the same value. For example, the text field 410 of illustrative graphical user interface 210 of FIG. 4A has a value of "20". The user may place the pointer of a pointing device 112, such as a mouse, over the element 410 or may click on the element 410, or may otherwise tab to the element 410 to cause it to have input focus. These activities may not change the value but nevertheless the detector 225 may detect such actions and a dirty indicator 250 is provided in accordance with the present invention. In another example, the user via the pointing device 112 and keyboard 110 may enter the value of "20" in the text field 410, replacing the previous value of "20" with a new value of "20". Although the user may not be able to detect the text field 210 value was replaced with the same value, the detector 225, in one embodiment, detects this action in order to provide a dirty indicator 250 as described herein.

In one embodiment, the detector 225 detects if the action to change the value of the editable element 410, 420 and 430 does change the value of the editable element. In some embodiments, the detector 225 compares the value of the editable element with the initial value presented or the previously saved value, which in one embodiment is stored in the persistent data storage 230.

In a similar manner as the illustrative text field 410, a user may place a pointer of a pointing device 112 on or over either of the combo-boxes 420 and 430, put input focus on the combo-box 420, 430 via the pointing device 112, and select a selection provided by the combo-box, such an item in a list of a pop-up form. Additionally, a user may place input focus via the pointing device 112 on the selection field associated with the combo-box 420, 430 and enter in via the keyboard 110 one or more alphanumeric characters, such as a string, to provide a value for the combo-box 420, 430. In other embodiments, actions to change the value of the combo-box 420, 430 may occur programmatically via executable instructions. The detector 225 can detect actions by the user or by executable instructions to change the value of the combo-box 420, 430.

At illustrative step 315 of the present invention, once the action to change the editable element 410, 420 and 430 is detected, the element is tracked as "dirty". Any suitable mechanism or means known to one ordinarily skilled in the art may be used to track the "dirty" status of an element detected by the detector 225. For example, any type of variable, data structure or object may be used to associate an element of the user interface 210 with a "dirty" status. In one embodiment, the "dirty" status of an element may be stored and tracked in the persistent data storage 230 of the present invention.

Figure 4B:
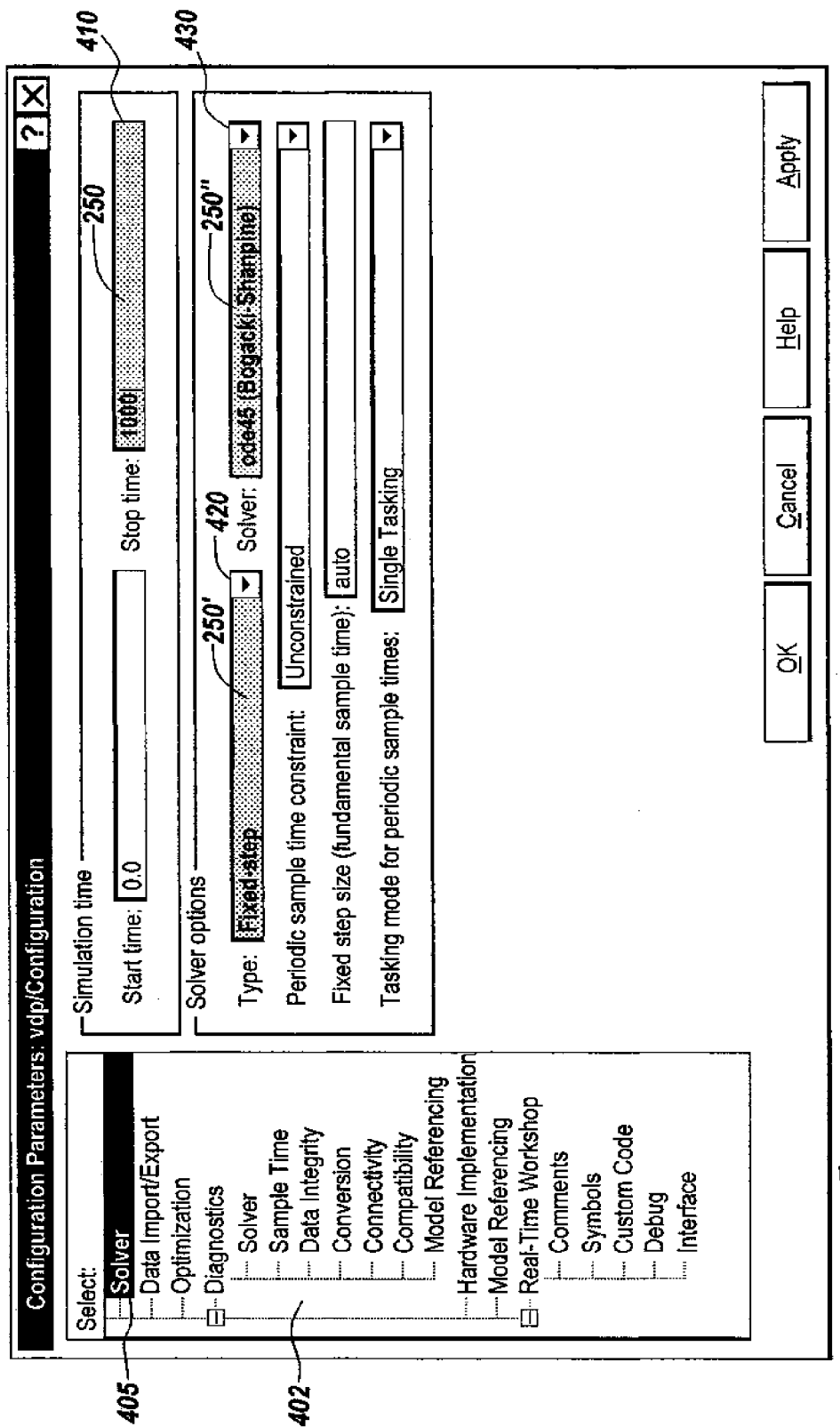

Upon detection of the action to change the editable element at step 310, the illustrative method 300 of the present invention provides an indicator 250 in the user interface 210 that the element is "dirty". As depicted in the illustrative graphical user interface 210 of FIG. 4B, indicators 250, 250' and 250" are provided for the text field 410, combo-box 420 and combo-box 430, respectively. The indicators 250, 250' and 250" may comprise a visual indicator. For example, as illustrated in FIG. 4B, the indicators 250, 250', and 250" may comprise any type of color, such as a background color, distinguishable from the editable element 410, 420 and 430 associated with the indicator. Additionally, the indicators 250, 250', and 250" may comprise any type of graphical pattern, such as a background color pattern, as also illustrated in FIG. 4B. In other embodiments, any of the indicators 250, 250', and 250" may comprise an auditory, force, and/or tactile indicator. As discussed in conjunction with FIGS. 2A and 2B, the indicators 250, 250' and 250" may comprise any type and combination of visual, auditory, force, or tactile type indicator.

Furthermore, each indicator 250, 250', and 250" is provided so that it is associated with the respective editable element 410, 420 and 430. That is, for example, indicator 250 is placed in the user interface 210 near or proximate to element 410. In this manner, the indicator 250 provides a cue or prompt to the user that the element 410 is "dirty", e.g., an action has been taken to change the value, and that the user may desire to either undo or save the change. In embodiments using an auditory, force, and/or tactile type indicator, the indicator 250, 250' may be associated with the element 410, 420 and 430 in such a manner as to provide an audible and/or touch related cue or prompt to the user.

At step 325 of the illustrative method 300 of the present invention, the value of the editable element 410, 420 and 430 may be applied, saved or otherwise committed as a change, or canceled. For example, upon prompt of the indicators 250, 250' and 250", the user may review the values of the elements 410, 420 and 430, and save the changed values by selecting an Ok or Apply command button, such as those illustrated in FIG. 4B and known by those ordinarily skilled in the art. In one embodiment, the value of the editable elements 410, 420 and 430 are saved to the persistent data storage 230. In another example, the user may decide to cancel the values of the editable elements 410, 420, and 430 associated with the visual indicators 250, 250' and 250". In one embodiment, the user may apply the changed values of the editable elements 410, 420 and 430 without saving the changes to a persistent data storage 230. For example, the user may apply the new value of the editable element to determine the effect on another portion of the user interface 210, such as a graph, a calculation or a value of another element dependent on the changed element. Instead of saving the new value of the editable element, the user may cancel the changes by selecting the cancel button, or by otherwise exiting from the graphical user interface 210. One ordinarily skilled in the art will recognize and appreciate the various ways that a value for an element of a user interface may be canceled, applied, saved or committed to a persistent data storage 230.

Upon either saving, applying, or canceling the value of an editable element having a dirty indicator 250 from step 325, the illustrative method 300 of the present invention tracks the element as not "dirty" at step 330, and removes the indicator 250 associated with the element at step 340. As discussed above with respect to step 315, any suitable mechanism or means known to one ordinarily skilled in the art may be used to track the status of an element of the user interface 210 as not "dirty", and in one embodiment, the persistent data storage 230 may be used for such purposes. In some embodiments, upon saving or canceling the value of an editable element having a dirty indicator 250, the illustrative method 300 of the present inventions tracks the element as not "dirty" at step 330 and then closes, quits or otherwise stops displaying the user interface 215. In these cases, step 340 of illustrative method 300 is not performed as the user interface 215 and the editable element having a dirty indicator 250 is no longer viewable by the user.

In some embodiments, the dirty indicator 250 comprises a visual indicator 250, and at step 340 an action is taken on the visual indicator 250 so that it is no longer visible in the user interface 210 in association with the element, e.g., 410, 420 or 430. In one embodiment, the visual indicator 250 may be removed from the user interface 210 entirely. In another embodiment, the visual indicator 250 may be modified to be placed in the background of the user interface 210 effectively hiding it from view of the user. In a further embodiment, the visual indicator 250 may be modified to change its color, font or other visual attributes to effectively mask the visual indicator 250 from being seen by the user.

In the case where the dirty indicator 250 comprises an auditory, force and/or tactile type of indicator, the present invention at illustrative step 340 stops providing the sensory output of such an indicator. In one embodiment, the sound from an auditory type indicator 250 is either no longer played or produced, or the volume set to a level that is no longer audible. In another embodiment, the sensory feedback from a tactile or force type indicator 250 is either no longer generated or provided, or the level of such feedback is set that it is no longer sensed. One ordinarily skilled in the art will recognize and appreciate the various ways that any of the visual, auditory, force, or tactile type dirty indicators 250 may be removed from association with an element of the user interface 210.

In some embodiments, the dirty indicator 250 may be provided at step 320 of illustrative method 300 and removed or changed at any of the steps 325, 440 and 340 based on different scenarios of interaction with the user interface 210.

In one embodiment, the dirty indicator 250 is removed when the user selects an apply command button or any other similar user interface 210 function that effects the value of the element to the functionality or behavior of the user interface 210. For example, in response to the prompt of the dirty indicator 250 the user may apply the changed value of the element to determine the effect on the operation and behavior of the functionality implemented by the user interface 210. In some cases, the apply command only applies the value to the user interface 210 functionality without saving it to a persistent data storage 230, such as to a file or a database. In other cases, the apply command applies the value to the user interface 210 functionality and saves the value to the persistent data storage 230. In these cases, the dirt indicator 250 provides a prompt that the value of the element may have changed from its initially presented value in the user interface 210 or from the last applied value for the element, which may be different than the value of the element stored in the persistent data storage 230. Once the value of the element is applied and even though not saved, the dirty indicator 250 may be removed and the element tracked as not "dirty.".

In other embodiments, even though the value of the element may have been applied to the functionality of the user interface 210, the dirty indicator 250 may only be removed after the value of the element has been saved to a persistent data storage 230. For example, in response to the prompt of the dirty indicator 250 the user may apply the changed value of the element to see the effect on the functionality of the user interface 210. After applying the changed value of the element, the dirty indicator 250 remains and the element is still tracked as "dirty." After the user confirms the effects of the changed value on the user interface 210 are as desired, the user may save the changed value to a persistent data storage 230, such as by selecting an Ok or save command button as known by those ordinarily skilled in the art. At applying and saving the changed value, the dirty indicator 250 may be removed and the element tracked as not "dirty."

In another embodiment, the user may confirm the effects of applying the changed value on the user interface 210 are not as desired and therefore cancel or undo the change to the value of the element. For example, the user may select a cancel or undo command button as known to those ordinarily skilled in the art. The cancel command may exit from the form or user interface 210 and not save the changed value to persistent data storage 230. An undo command may change the value of the element to a previous value before it was changed. The user may also effectively cancel the changed value by exiting from the user interface 210 via an exit button or any other quit or exit functionality provided by the user interface 210. In the cases where the dirty indicator 250 remains after applying or effecting the changed value to the user interface 210, the dirty indicator 250 provides a prompt that the value of the element may have changed from its persistent value stored in the persistent data storage 230. The element is tracked as "dirty" and the dirty indicator 250 is provided until the value of the element is either saved or canceled.

In another embodiment, instead of removing the dirty indicator 250 after applying the changed value to the user interface 210, the dirty indicator 250 is changed to indicate that the "dirty" element was applied but not saved or canceled. For example, a first dirty indicator 250 may be provided upon detection of action to change a value of the element of the user interface 210. The first dirty indicator 250 may be of a certain color. Upon prompt of the first dirty indicator 250, the user may apply the change to the user interface 210 without saving it. The element may be still tracked as "dirty" but also tracked as applied and not saved or canceled. Additionally, the first dirty indicator 250 may be changed, modified, replaced, or substituted to effectively provide a second dirty indicator 250. The second dirty indicator 250 may be a different color than the first dirty indictor 250 or otherwise is distinguishable from the first dirty indicator 250. The second dirty indicator 250 provides an indication that the element is still "dirty" but has been applied but not saved or canceled. Upon either saving or canceling the change to the element, the second dirty indicator 250 may be removed, and the element tracked as not "dirty." The first dirty indicator 250 provides a prompt that the value of the element may have changed but has not yet been applied, and the second dirty indicator 250 provides a prompt that the value of the element has been applied but not saved or canceled.

Furthermore, the second dirty indicator 250 may be provided in such a manner so that in comparison to the first dirty indicator 250 the second dirty indicator 250 indicates the "dirty" element is less "dirty." (e.g., applied but not saved). In one embodiment, the second dirty indicator 250 may be grayed out, dimmed or otherwise a lighter color than the first dirty indicator 250. For example, the first dirty indicator 250 may be a gray color and after applying the value of the element, the second dirty indicator 250 may be a lighter shade of gray. Likewise, with any auditory, force or tactile type dirty indicator 250, the second dirty indicator 250 may be of a lesser volume, force and/or touch as compared to the first dirty indicator 250. One ordinarily skilled in the art will recognize and appreciate the various ways a dirty indicator 250 may be changed, modified or replaced to indicate the dirtiness of an element to a lesser or a higher degree in any desired granularity.

Figure 3B:
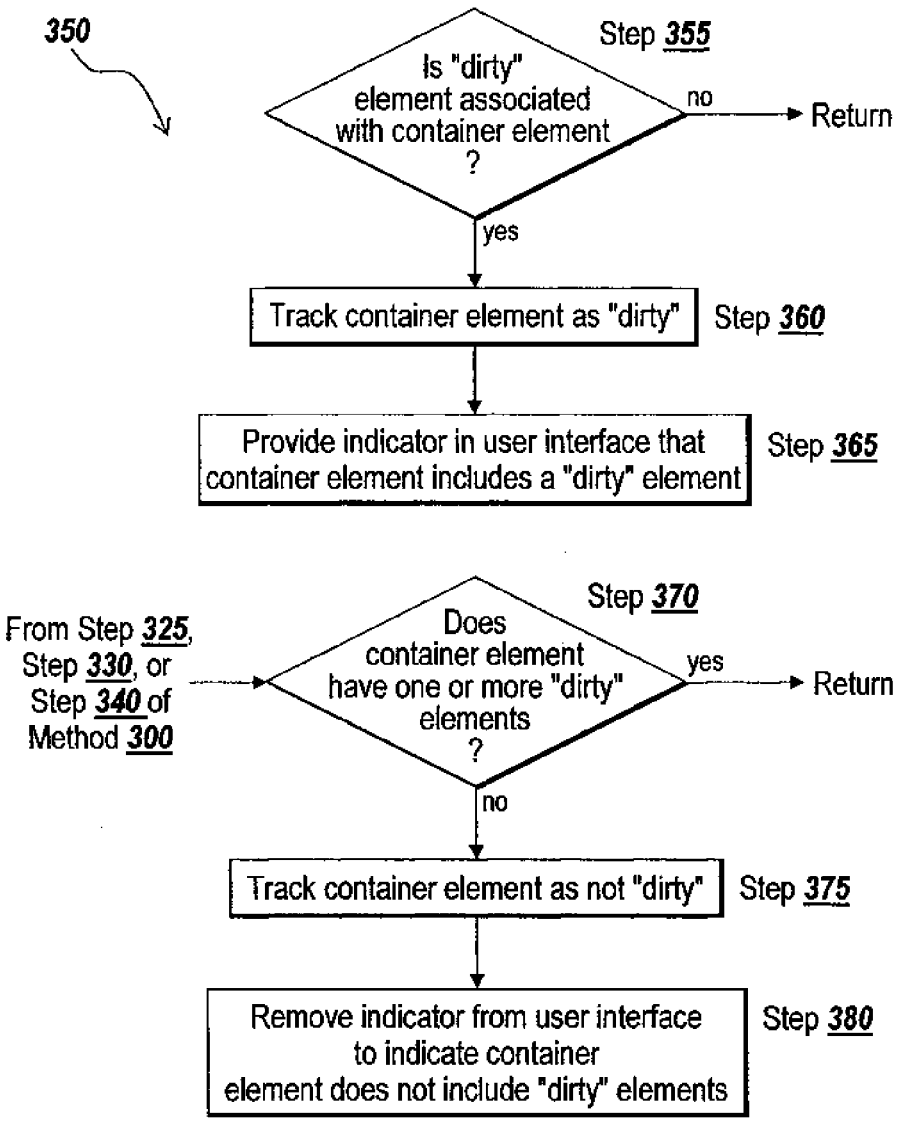
FIG. 3B is a flow diagram depicting another illustrative method for practicing an embodiment of the present invention with a container type graphical user interface element as illustrated in FIG. 4C.
Figure 4C:
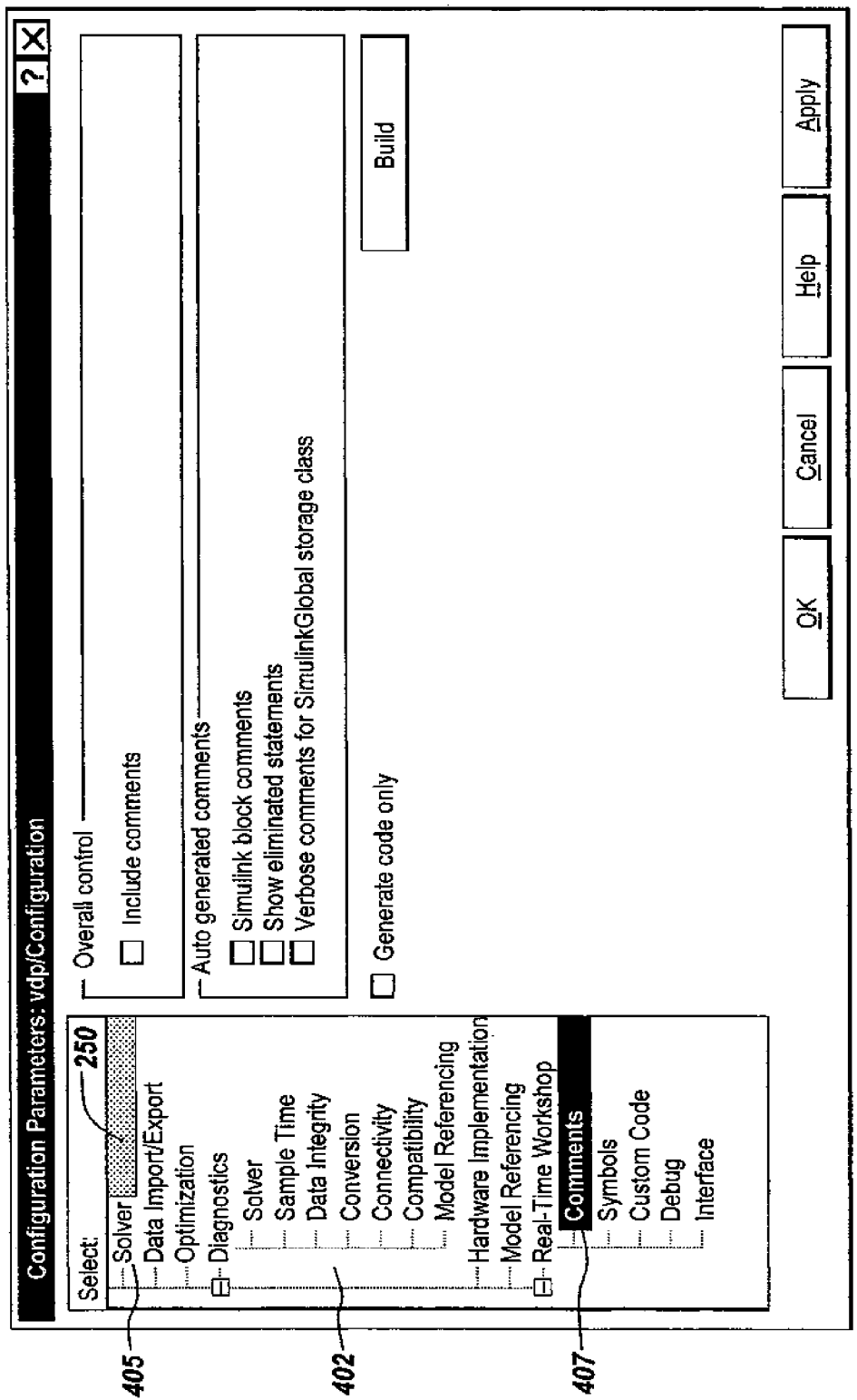
FIG. 4C is a diagrammatic view of another illustrative graphical user interface for practicing an embodiment of the present invention.

FIG. 3B depicts an illustrative method 350 of using the techniques of the present invention to provide a dirty indicator 250 in association with a group of elements, such as elements associated with a container widget. As described in the illustrative graphical user interface 210 of FIGS. 4A and 4B, the editable elements 410, 420 and 430 are part of the Solver 405 selection of the tree widget 402. The tree widget 405 comprises a collection of one or more selections, such as the Solver 405 selection and the Comments selection 407 as illustrated in FIG. 4C. Each selection 405, 407 present a group, set or collection of user interface elements associated with the selection. For example, for the Solver 405 selection of the tree widget 402, the editable elements 410, 420 and 430 are displayed as illustrated in FIGS. 4A and 4B. When the Comments 407 element is selected from the tree widget 402, the Solver 405 elements are no longer displayed, and the elements of the user interface associated with the Comments 407 selection are displayed as illustrated in FIG. 4C.

As the user may navigate through one or more selections, e.g., 405, 407, of the tree widget, actions may be detected to change the value of an editable element and provide a dirty indicator 250 for the editable elements as described in conjunction with illustrative method 300 of FIG. 3A. For example, the user may change the editable elements 410, 420 and 430 associated with the Solver 405 selection and dirty indicators 250, 250' and 250" provided as illustrated in FIG. 4B. Although the dirty indicators 250, 250' and 250" are provided to prompt the user about the dirty status of the elements 410, 420 and 430, the user may navigate to another selection, such as the Comments section 407 depicted in the illustrative graphical user interface 210 of FIG. 4C. The techniques of the present invention will provide a dirty indicator 250 for the Solver 405 selection of the tree widget 402 to indicate that there are one or more elements associated with the Solver 405 selection having a dirty status. As illustrated in FIG. 4C, the Solver 405 selection comprises a dirty indicator

250. In the case of a visual dirty indicator 250, the dirty indicator 250 may be provided such that the dirty indicator 250 is visible when the Solver 405 selection, for example, is selected or multi-selected with another selection of the illustrative tree widget 402.

At step 355 of the illustrative method 350, the present invention determines if the dirty element is associated with a container element, such as the tree widget 402 illustrated in FIGS. 4A-4C. In one embodiment, step 355 is performed with or at either step 315 or step 320 of illustrative method 300. Any suitable mechanism or means may be used as known by those ordinarily skilled in the art to determine if a dirty element is contained in or otherwise associated with another element of the user interface. In one embodiment, the present invention uses application programming interface (API) calls related to the element and/or the container widget 402 to determine an association.

At illustrative step 360 of the present invention, if the dirty element is associated with a container element, such as the tree widget 402, the container element is indicated and tracked as having a "dirty" status. As with tracking the "dirty" status of an element as discussed above, any suitable mechanism or means may be used. By way of example of FIGS. 4B and 4C, the Solver 405 selection is tracked as "dirty" since the editable elements 410, 420 and 430 associated with the Solver 405 selection are "dirty".

At step 365 of the illustrative method 350, a dirty indicator 250 is provided in a manner associated with the container element having the dirty elements. In one embodiment as illustrated in FIG. 4C, the dirty indicator 250 comprises a visual indicator that is visually distinguishable from the element of the container widget 402. For example, as illustrated in FIG. 4C, the dirty indicator 250 for the Solver selection 405 may comprise a background color and/or pattern distinguishable from the visual attributes of the Solver selection 405 itself. As discussed above, the dirty indicator 250 for an element of the container widget may comprise any type and form of visual, auditory or tactile type indicator. Further, although generally illustrated with a tree container widget 402, those ordinarily skilled in the art will recognize and appreciate that any type of container widget may be used or any graphical element associating a group of other elements may be used in practicing the operations of the present invention described herein.

At steps 370, 375 and 380 of illustrative method 300 of the present invention, the dirty status of a container element is tracked until the container element does not have any associated elements associated having a dirty status. The dirty indicator 250 associated with the container element will be removed once all elements associated with the container element have their respective dirty indicators removed. At step 370, the illustrative method 300 checks if the container element has one or more dirty elements associated with it. In one embodiment, step 370 may performed with or at any of the steps 325, 330 and 340 of illustrative method 300.

If the container element is determined to not have any dirty elements associated with it at step 375, the container element is tracked as not having a "dirty" status and at step 380, the dirty indicator 250 associated with the container element is removed. Otherwise, if the container element still has dirty elements associated with it, the container element remains tracked with a "dirty" status and the dirty indicator 250 associated with the container element is not removed.

In some embodiments, the dirty indicator 250 associated with the container element may change or otherwise be different based on whether all, none or a portion of the elements associated with the container element are "dirty". That is, the dirty indicator 250 not only indicates that an element associated with the container element is dirty, but may also indicate the quantity and/or type of "dirty" elements. For example, if all the elements associated with the container element are "dirty", then a first type of dirty indicator 250 may be provided. In another example, if only one element associated with the container element is "dirty" then a second type of dirty indicator 250, different than the first type of dirty indicator 250 may be used. In other cases, a dirty indicator 250 may be provided that indicates the number and/or type of "dirty" elements associated with the container element. For example, the dirty indicator 250 may comprise a number indicating the number of dirty elements. Additionally, the dirty indicator 250 may provide a pop-up form or by other suitable means and/or mechanisms a list of the "dirty" elements by name, type and/or other attributes. One ordinarily skilled in the art will recognize and appreciate the variety of ways that the dirty indicator 250 may also provide information or an indication of the portion and/or type of the elements of the container element that are "dirty."

Figure 5:
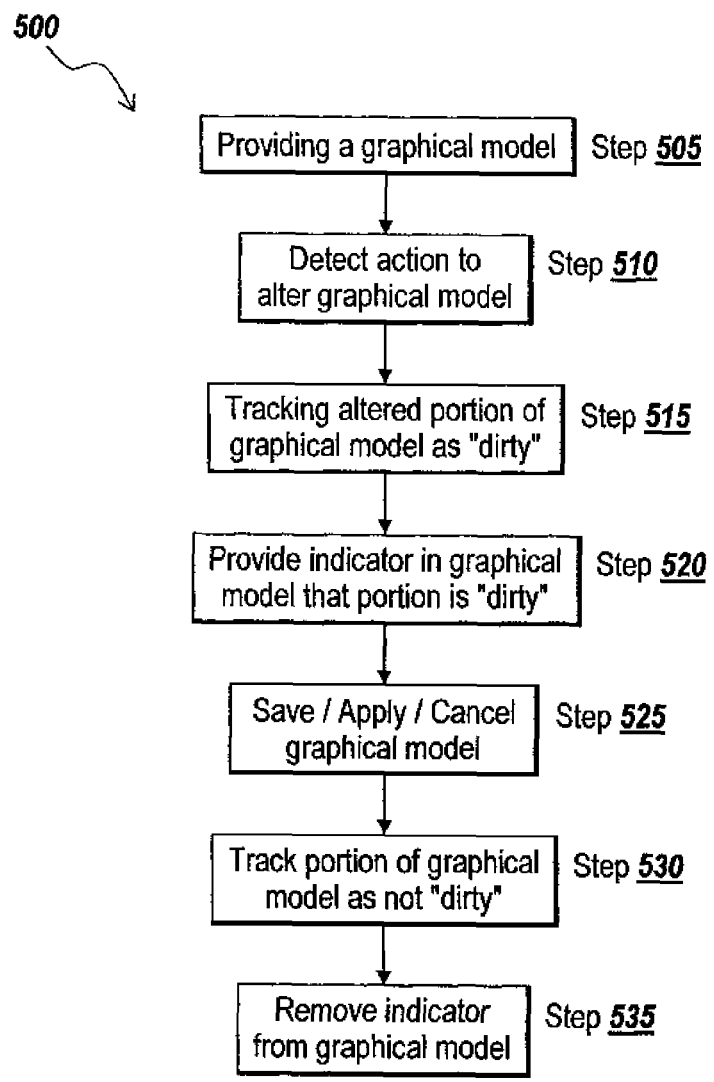
FIG. 5 is a flow diagram depicting an illustrative method for practicing an embodiment of the present invention with the illustrative graphical models of FIGS. 6A, 6B, and 6C.

In another aspect, the techniques of the present invention can also be applied to graphical models, such as a graphical model 220 provided by the graphical modeling environment 120. In an exemplary embodiment, the techniques of the present invention are used for a block diagram model 220 provided by the graphical modeling environment of Simulink®. FIG. 5 depicts an illustrative method 500 of practicing the techniques of the present invention in conjunction with a graphical model 220 as illustrated in FIGS. 5A and 5C.

Figure 6A:
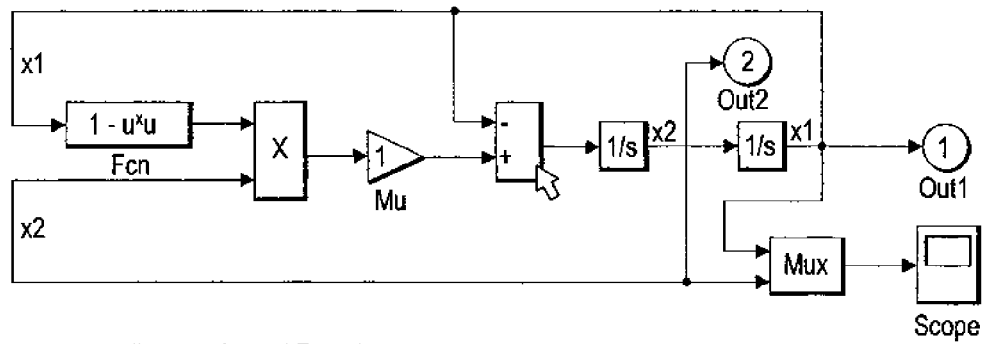
FIGS. 6A, 6B, and 6C are diagrammatic views of illustrative graphical models for practicing another embodiment of the present invention.

At step 505 of illustrative method 500 of the present invention, a graphical model 220 is provided, such as the graphical model 220 of FIG. 6A. In brief overview, the illustrative graphical model 220 of FIG. 6A comprises a block diagram model such as a block diagram model generated with or otherwise provided by Simulink® in an exemplary embodiment. The block diagram model 220 of the present invention provides a graphical representation for illustration purposes of the van der Pol Equation, which is known by those ordinarily skilled in the art and is used herein simply as an example algorithm for graphical modeling.

The block diagram model 220 of FIG. 6A comprises a series of various functional blocks connected by one or more lines representing signals. Any of the blocks, lines and other elements of the block diagram model 220 may be selected, for example, clicked by a pointing device 112, to present a user interface, such as any user interface 210 of the present invention, to further configure, modify, change or otherwise alter the graphical model 220. In other embodiments, any elements of the block diagram model 220, such as a block or line, may be selected and repositioned, moved, relocated or deleted. Additionally, new elements, such as blocks or lines, may be added to the graphical model 220 as may be provided by any graphical modeling environment 120, such as via any sequence of pointing device 112 and/or keyboard 110 input. Furthermore, the graphical modeling environment 120 may provide any means or mechanisms to programmatically change or alter the graphical model 220. For example, an application programming interface (API) may be called to add a block to the block diagram model 220.

At step 510 of the illustrative method 500, an action to change an element or portion of the graphical model 220 is detected. In an exemplary embodiment, a detector 225 associated with the graphical model 220 and/or the graphical modeling environment 120 detects an action to change any of the elements of the graphical model 220, or otherwise alter graphical model 220. For example, a user may have placed the pointer over any element, such as line or block, clicked the pointer of the pointing device 112 to place input focus on the element, and entered via the keyboard 110 one or more characters, such as a sequence of key stroke commands recognized by the graphical modeling environment 120. In another example, the user may select an element of the graphical model 220, such as a line or block, and may attempt to move or actually move the element to another location in the graphical model 220. In one embodiment, the user may select an element of the graphical model 220 and move the element but put the element back in the same location.

Figure 6B:
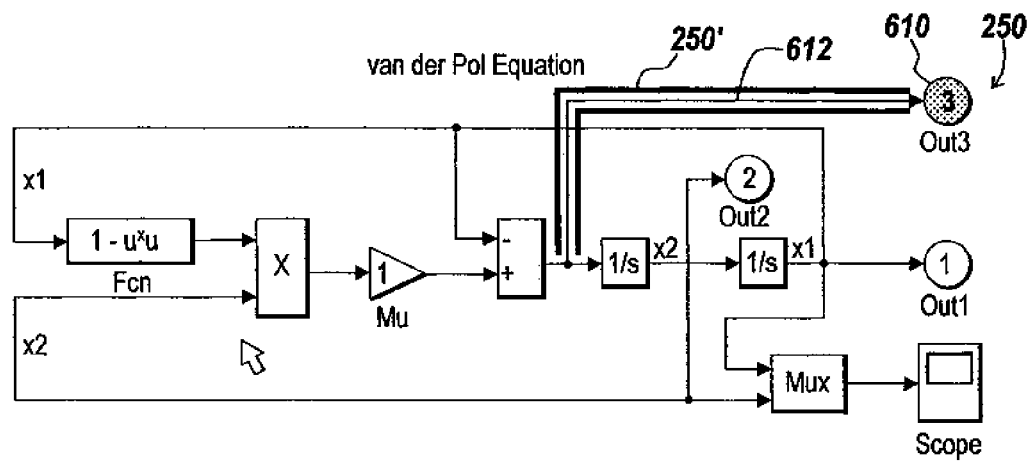

In the illustrative example depicted in FIG. 6B, a new block 610 and a new connecting line 612 is added to the graphical model 220. The detector 225 may have detected one or more of the user activities to determine that an action was taken to add the block 610 and/or line 612. In some embodiments, one or more executable instructions, such as a program, may have been executed to take an action to alter the graphical model 220 to add elements 610 and 612. In one embodiment, the executable instructions may simulate the same activity from the user in adding these elements 610 and 612. In these cases, the detector 225 may detect the actions by the executable instructions to perform the actions of adding these elements 610 and 612.

In another embodiment, the illustrative step 610 may detect the action to alter the graphical model 220 even if the graphical model 220 is not altered by the action. For example, the user may delete a line or block of the block diagram model 220 of FIG. 6A and add the same line or block to the block diagram model 220 so that the block diagram model 220 has not effectively changed. The detector 225 may detect an alteration of a graphical model 220 upon selecting or having input focus on any element or portion of the graphical model 220. For example, the user may place the pointer of a pointing device 112, such as a mouse, over an element of the graphical model 220 or may click on the element, or may otherwise tab to the element to cause the element to have input focus. These activities may not alter the graphical model 220 but nevertheless the detector 225 may detect such actions and a dirty indicator 250 provided in accordance with the present invention. Although the user may not be able to detect an action was taken to alter the graphical model 220, the detector 225, in one embodiment, detects this action in order to provide a dirty indicator 250 as described herein. In one embodiment, the detector 225 detects if the action to alter the graphical model 220 does alter the graphical model. In some embodiments, the detector 225 compares the graphical model 220 to the initially presented graphical model 220 at step 505 or to a previously saved or last saved version of the graphical model 220, which in one embodiment is stored in the persistent data storage 230.

In other embodiments, a dirty indicator 250 may be provided based on criteria other than graphical changes to the graphical model 220. In one embodiment, a checksum of the graphical model 220 may be compared to determine whether to provide a dirty indicator 250. As one ordinarily skilled in the art will appreciate, a checksum provides a computed value that depends on the contents of a set of data, such as the data of the graphical model 220, and is used to determine if the data has been altered. A checksum value can be compared with a known or previously saved checksum value to determine if there was a change related to the contents of the set of data. In some embodiments, the present invention may use one or more of the following types of checksums for detecting an action to alter a graphical model 220 or for otherwise determining a change to the graphical model 220: a structural checksum, a parameter checksum, a graphical checksum, a configuration checksum, and/or a dependency checksum.

A structural checksum may be used to detect any type or form of topological change to the graphical model 220, such as a new element added to the graphical model 220. A parameter checksum may be used to detect changes to any parameter values associated with the graphical model 220, such as a parameter used in the function or operation of a block in a block diagram model. A graphical checksum may be used to detect changes in the graphical appearance of the graphical model 220, such as a change to the arrangement of blocks in a block diagram model. A configuration checksum may be used to detect a change in configuration information related to the graphical model 220, such as determining the mode of execution of the graphical model 220 or configuration information related to code generation and compilation output. A dependency checksum may be used to detect any changes to any dependencies between the relationships of elements of the graphical model 220.

In one embodiment, if a block of the graphical model 220 is moved without changing the structure and/or operation of the graphical model 220 then a structural checksum may indicate that no changes occurred to the graphical model 220 and as a result, a dirty indicator 250 is not provided. However, if a graphical checksum is used then the change may be detected and a dirty indicator 250 provided. One ordinarily skilled in the art will recognize and appreciate the various forms and types of checksums that may be used to detect changes to a graphical model in some embodiments of the present invention described herein.

In another embodiment, the dirty indicator 250 is provided in accordance with configurable rules, such as user preferences, configured, set or otherwise provided to the graphical modeling environment 120. For example, a user preference may indicate that even if the user moved a block and a structural checksum indicates no structural changes to the graphical model 220, a dirty indicator 250 should be provided to indicate the moving of the block. In another example, a configured rule of the graphical modeling environment 120 may indicate to either provide or not provide a dirty indicator 250 when a signal or connecting line in the graphical model 220 is re-routed, or otherwise moved or re-arranged. One ordinarily skilled in the art will recognize and appreciate how the graphical modeling environment 120 may be configured to set preferences or rules when a dirty indicator 250 should or should not be provided.

At illustrative step 515 of the present invention, once the action to change or otherwise alter an element or portion of the graphical model 220 is detected, the element or portion is tracked as "dirty". Any suitable mechanism or means known to one ordinarily skilled in the art may be used to track the "dirty" status of an element of the graphical model 220 detected by the detector 225. For example, any type of variable, data structure or object may be used to associate an element of the user interface 210 with a "dirty" status. In one embodiment, the "dirty" status of an element of the graphical model 220 may be stored and tracked in the persistent data storage 230 of the present invention. For example, the graphical model 220 may be stored in a model file in a format accessible and readable by the graphical modeling environment 120.

Upon detection of the action to change or alter the graphical model 220, the illustrative method 500 of the present invention provides a dirty indicator 250 in the graphical model 220 to indicate the detected element is "dirty". As depicted in the illustrative graphical model 220 of FIG. 6B, indicators 250, 250' are provided for the block 610 and line 612, respectively. The dirty indicators 250 and 250" may comprise a visual indicator. For example, as illustrated in FIG. 6B, the indicators 250 and 250' may comprise any type of color, such as a background color, distinguishable from the element 610 and 612 associated with the indicator. Additionally, the dirty indicators 250 and 250' may comprise any type of graphical representation, such as a background pattern or a bounding box as also illustrated in FIG. 6B. In other embodiments, any of the indicators 250 and 250' may comprise an auditory and/or tactile indicator. As discussed in conjunction with FIGS. 2A and 2B, the indicators 250 and 250' may comprise any type and combination of visual, auditory or tactile type dirty indicator 250.

Furthermore, each dirty indicator 250 and 250' is provided so that it is associated with the respective element 610 and 612. That is, for example indicator 250 is placed in the graphical model 220 near or proximate to element 610. In this manner, the dirty indicator 250 provides a cue or prompt to the user that the element 610 is "dirty", e.g., an action has been taken to alter the graphical model 220 via this element, and that the user may desire to either undo the alteration or save the graphical model 220. In embodiments using an auditory or tactile type indicator, the dirty indicator 250, 250' may be associated with the element 610 and 612 in such a manner as to provide an audible and/or touch related cue or prompt to the user.

At step 525 of the illustrative method 600 of the present invention, the graphical model 220, or any portion thereof, may be saved or otherwise committed to persistent data storage 230. For example, upon prompt of the dirty indicators 250 and 250" in FIG. 6B, the user may review the associated elements, and save the graphical model 220 by any suitable mechanism or means provides by the graphical modeling environment 120. In one embodiment, the graphical model 220 is saved to the persistent data storage 230, such as in an exemplary embodiment of Simulink®, a file having contents representing the graphical model 220. In another example, the user may decide to cancel any possible alterations to the graphical model 220 to leave the graphical model intact as provided at step 505. The user may cancel, undo or otherwise revert back to the graphical model 220 provided at step 505 prior to any actions to alter the graphical model 220 being detected by the detector 225. One ordinarily skilled in the art will recognize and appreciate the various ways that a graphical model 220, and any portions thereof, may be applied, saved or committed to a persistent data storage 230 or the altered portion canceled.

Figure 6C:
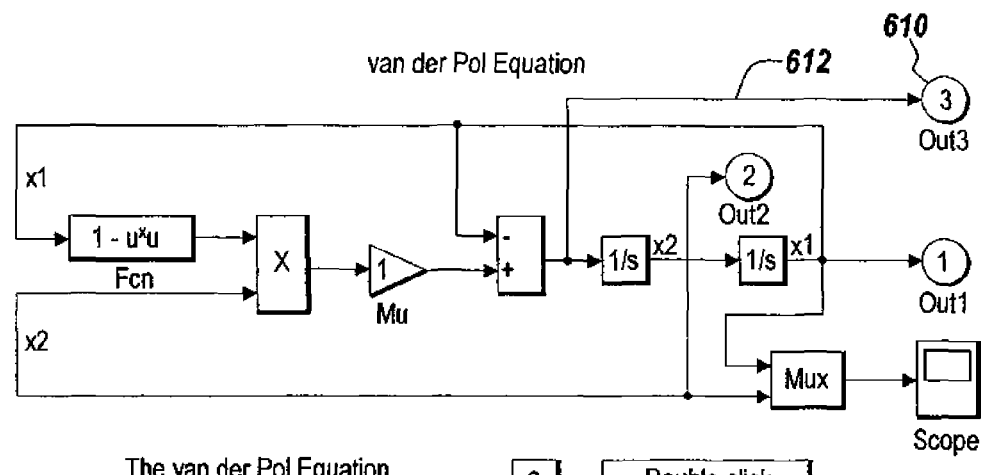

Upon either saving or canceling the possible or actual alterations to the graphical model 220, the illustrative method 500 of the present invention tracks the element or portion of the graphical model as not "dirty" at step 530, and removes the dirty indicator 250, 250' associated with the element 610, 612 at step 540. As discussed above with respect to step 515, any suitable mechanism or means known to those ordinarily skilled in the art may be used to track the status of an element or portion of the graphical model 220 as not "dirty", and in one embodiment, the persistent data storage 230 may be used for such purposes. As illustrated by FIG. 6C, the dirty indicators 250, 250' are removed upon saving the graphical model 220. For example, the user may review the dirty indicators 250, 250' associated with elements 610 and 612, determine the changes should be saved, and then save the changes. As such, the elements 610 and 612 are no longer "dirty" and their status is tracked as not "dirty" and the dirty indicators 250, 250', such as visual, auditory and/or tactile indicators, are removed. One ordinarily skilled in the art will recognize and appreciate the various ways that any of the visual, auditory or tactile type dirty indicators 250 may be removed from association with an element or portion of the graphical model 220.

Although the discussions above generally describe providing dirty indicators 250 for elements added to a graphical model 220, the techniques of the present invention provide dirty indicators 250 for any elements that may be removed, or altered in some way. In one embodiment, if element 610 was removed from the graphical model 220 of FIG. 6C, a dirty indicator 250 may be provided in the location of the element 610. In one case, the dirty indicator 250 may be a phantom or shadow representation of element 610, or otherwise a representation to indicate what type of element 610 was previously located in the location of the graphical model 220, but since has been removed. In another embodiment, if element 610 was saved at step 525, and then an action was taken to modify or alter element 610, a dirty indicator 250 as illustrated in FIG. 6B would be provided. One ordinarily skilled in the art will recognize and appreciate how the techniques of the present invention are applied to removed and altered elements of the graphical model 220.

Furthermore, the illustrative method 500 may be applied to a graphical model 220 having an element, such as block of a block diagram model, which incorporates, includes, points to or otherwise references another graphical model 220. For example, in the illustrative graphical model 220 of FIG. 6B, the element 610 may instead be a block that references a second graphical model 220'. In these cases, the techniques of the present invention, such as those illustrated by method 350, can be used to provide a dirty indicator 250 associated with element 610 that indicates the second graphical model has one or more elements, or portions of it, that are detected as being "dirty." One ordinarily skilled in the art will recognize and appreciate how the illustrative methods of the present invention may be applied to an element of a graphical model 250 that references or incorporates another set of elements forming a graphical model, or any portion thereof, in a similar manner as the container element of illustrative method 350.

Figure 7A:
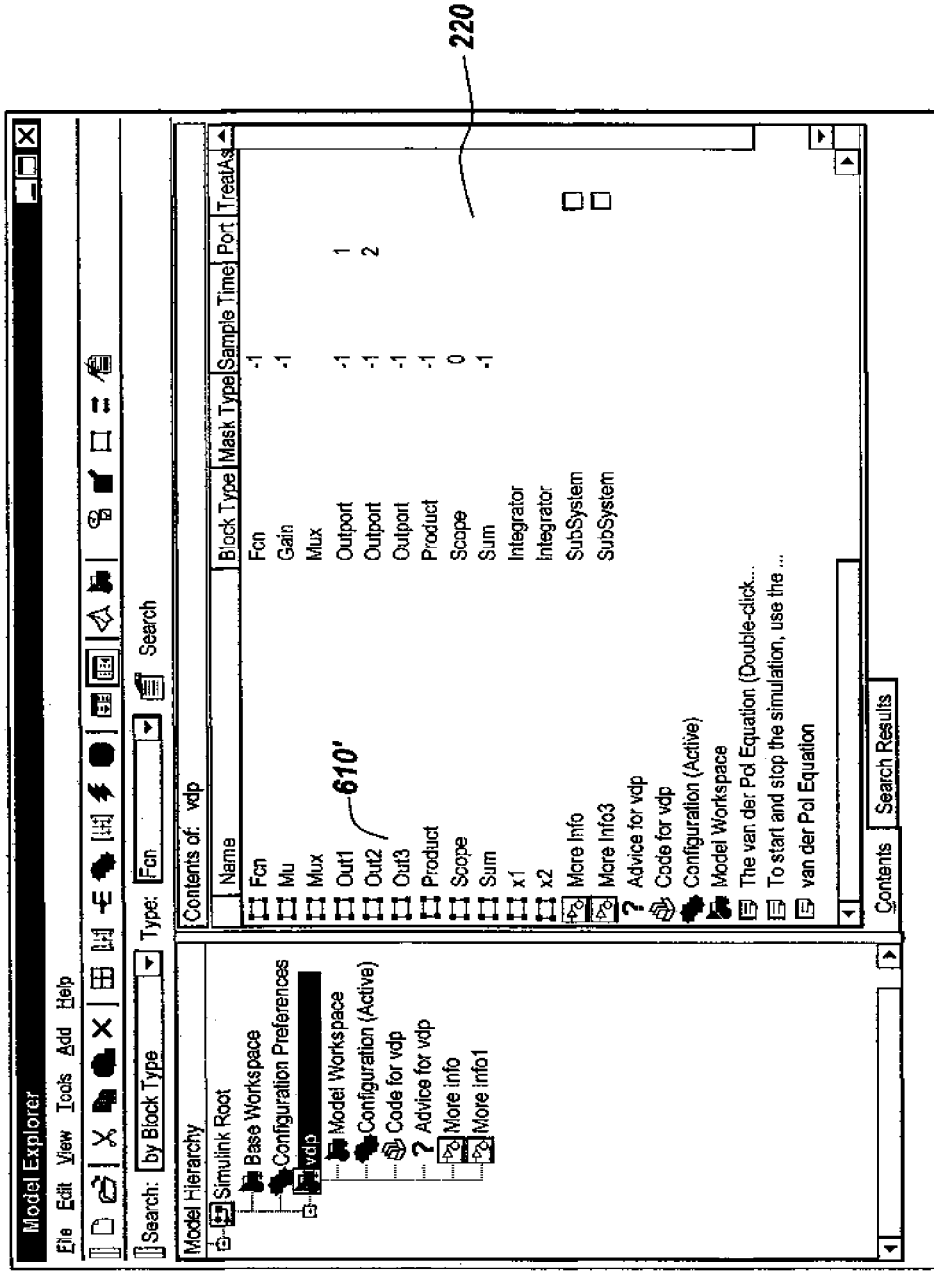
FIGS. 7A and 7B are diagrammatic views of illustrative graphical user interfaces representing the illustrative graphical models of FIGS. 6A, 6B and 6C.
Figure 7B:
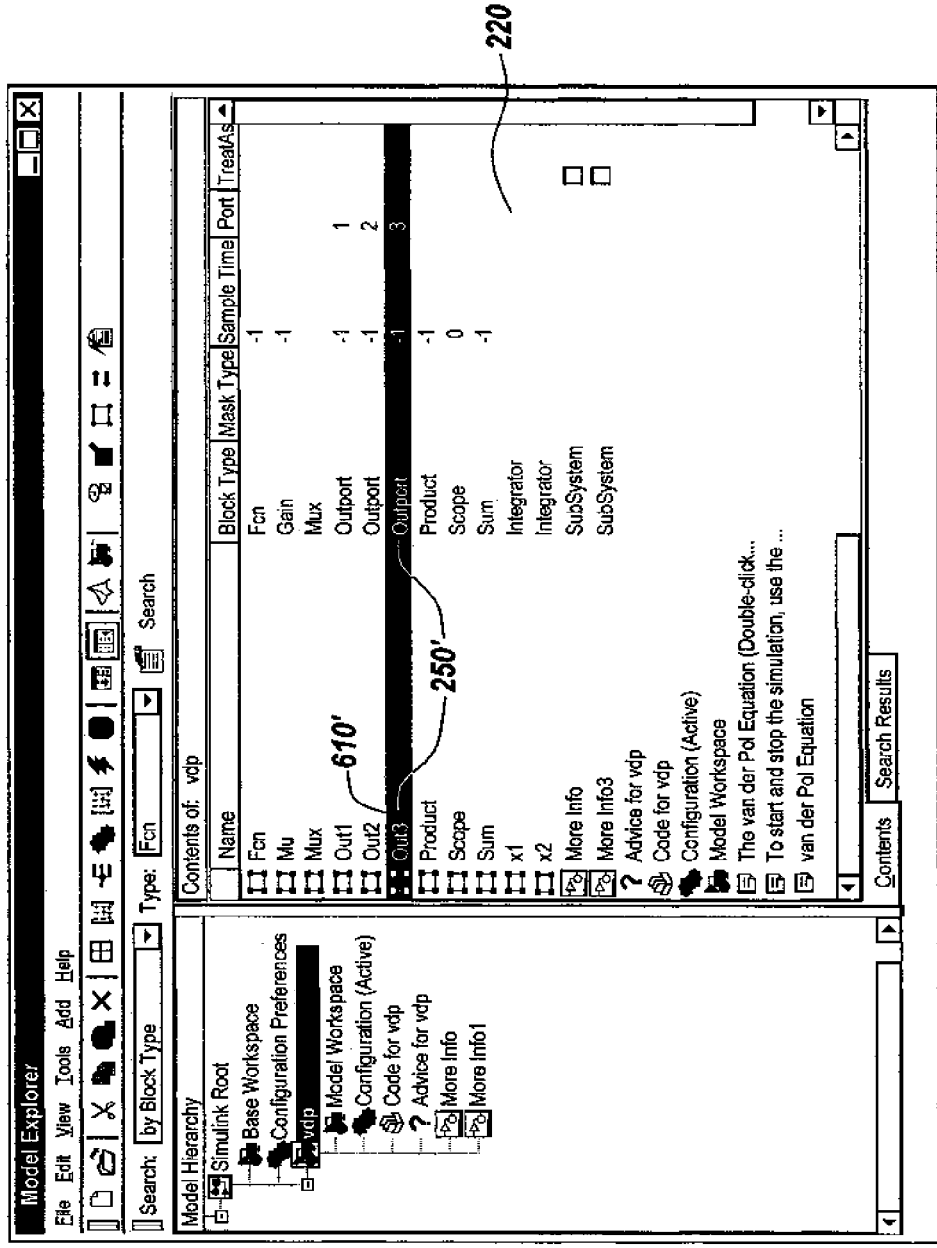

In another aspect of the present invention, a graphical model 220 such as those illustrated in FIGS. 6A-6C may also be represented in the form of a user interface 210. FIGS. 7A and 7B illustrate a portion of the graphical models 220 of FIGS. 6A-6C represented by elements in a user interface 210. FIG. 7A depicts a user interface element 610' representing the block 610 labeled "Out3" in the block diagram model 220 of FIG. 6B. In accordance with the techniques of the present invention, such as illustrative method 300, upon detection of an action to change the value of the user interface element 610', a dirty indicator 250' may be provided as illustrated in FIG. 7B. As such, the techniques of the present invention can be applied to graphical models 220 diagrammatically provided by the graphical modeling environment 120 and/or in the form of a user interface 210. In some embodiments, the techniques of providing a dirty indicator 250 for a container element as described above in conjunction with FIG. 3B may be used for graphical models 220 diagrammatically provided by the graphical modeling environment 120 and/or in the form of a user interface 210. In one example, a dirty indicator 250 may be used to indicate a container element in the user interface 210 representation of the graphical model 220 may have one or more associated elements, i.e., graphical model elements, that are "dirty." In another example, a block of a graphical model 220 may have a dirty indicator 250 to indicate that one or more subsystems or referenced graphical models in a hierarchical graphical model 220 may be "dirty" or comprise one or more "dirty" elements.

Figures 8A, 8B:
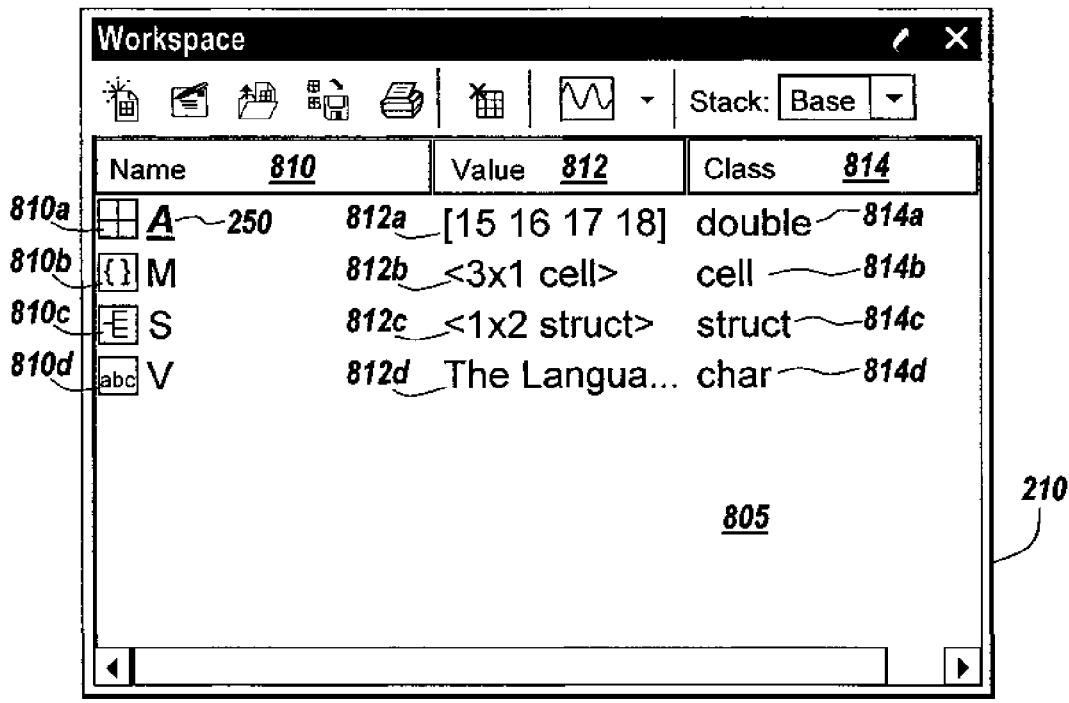
FIGS. 8A and 8B are diagrammatic views of illustrative workspace variables of the graphical modeling environment using the techniques of the present invention.

In an additional aspect, the techniques of the present invention can be applied to formatted text, such as variable or parameter names and associated properties and/or values. In the exemplary embodiment of Simulink® as the graphical modeling environment 120, the variables or parameters may be provided by the MATLAB® workspace. As known to those ordinarily skilled in the art, a MATLAB® workspace comprises a set of variables, such as named arrays, that are established and built up during a MATLAB® session and stored in memory. The MATLAB® workspace is interfaced with and is used or otherwise accessible by Simulink® to perform variable related operations in MATLAB®. FIGS. 8A and 8B depict illustrative user interfaces providing a listing of variables from a workspace. In brief overview, FIG. 8A illustrates a graphical user interface 210 comprising a workspace browser to view the name 810, value 812, and class 814 of each of the workspace variables 805. FIG. 8B illustrates a command line user interface 210', such as a MATLAB® command line environment, to view the name 810, value 812, and class 814 of each of the workspace variables 805. Any command, function or other executable instruction, such as the who and whos functions of MATLAB® illustrated in FIG. 8B, may be executed to provide a listing of workspace variables 805', with any associated variable properties. As depicted in FIGS. 8A and 8B, the illustrative workspace 805, 805' comprises four variables 810*a*-810*d* each with corresponding values 812*a*-812*n* and class types 814*a*-814*n*. For example, variable 810*a* named "A" is of class type 814*a* "double" with a value 812*a* of "[15 16 17 18]."

Using the techniques described herein, the present invention, in some embodiments, detects and tracks any changes to the name 810, value 812 or class 814, or any other property of any of the workspace variables 805 and provides a dirty indicator 250, 250' to indicate the detection. For example, the present invention may detect an action to change the name 810*a*, the value 812*a* and/or the class 814*a* of variable "A", and provide a dirty indicator 250, 250' associated with the variable 810*a* as illustrated in the user interfaces 210, 210' of FIGS. 8A and 8B. In this example, the dirty indicator 250, 250' may comprise a change to the font type, style, effects, size or any other font attribute of the variable name 810*a*. For example, as illustrated in FIGS. 8A and 8B, the dirty indicator 250, 250' may include changing the text of the variable name 810*a* "A" to be bold, italicized and/or underlined. The dirty indicator 250, 250' may be of a font that is different, visually or otherwise, in contrast and comparison to the font of the other variables 810*b*-810*d*.

In some embodiments, the dirty indicator 250, 250' may indicate that an action to change any attribute 810*a*, 812*a* and/or 814*a* of the variable may have been detected. In another embodiment, the dirty indicator 250, 250' may indicate that the name 810*a* of the variable has changed. In further embodiments, the dirty indicator 250, 250' may be associated with one or more of the attributes 810*a*, 812*a* and 814*a* that an action to change has been detected. In one embodiment, if the name 810*a*, value 812*a* and class 814*a* of the variable "A" has changed, a dirty indicator 250, 250' may be provided and associated with each of the name 810*a*, value 812*a* and class 814*a*. For example, if the value 812*a* of variable "A" 810*a* has changed then the changed value in the listing of the user interface 210, 210' may be indicated with a dirty indicator 250. The dirty indicator 250, 250' may provide a change of the font of all or a portion of the text or characters comprising the value 812*a*. Likewise, if the class 814*a* of the variable 810*a* has changed, then a dirty indicator 250, 250' may be provided in association with the class 814*a* and may include a change in the font of all or a portion of the text or characters identifying the class type.

Although generally described above as providing a dirty indicator 250, 250' for text via a change to the text, such as font type, the dirty indicator 250, 250' may be an additional element, such as a graphic, symbol, character or other type of dirty indicator 25 separate from but associated with the text. For example, an asterisk or some other character may be placed in front of or after the text in addition to or instead of the change in font of the text. Additionally, the dirty indicator 250, 250' may be any type of indicator as described herein, including any combination of sensory type of indicator, such as an auditory, force or tactile feedback. Furthermore, although applying the techniques of the present invention to formatted text are illustrated above via variables in a workspace of MATLAB®, one ordinarily skilled in the art will recognize and appreciate that the techniques of the present invention can be applied to any type and form of text in any suitable environment.

In another aspect, the dirty indicator 250 of the present invention may also provide a list of one or more values of the element related to a dirty element of a user interface 210 or a graphical model 220. The list of one or more values may provide the previous value of the element and in one embodiment, may also provide the current value of the element. In one embodiment, the dirty indicator 250 may provide a list of values that have been applied for the element but not saved. In another embodiment, the dirty indicator 250 may provide a historical list of values showing changes to the values of the element and which values have been applied, saved or canceled. In one embodiment, the dirty indicator 250 may be a selectable or clickable element that can provide a pop-up drop down list. For example, the dirty indicator 250 may be a graphical element, component or widget that has its own methods, properties and/or events. If a user selects the dirty indicator 250, the dirty indicator 250 may be configured to provide a list of values associated with the changes to the values of the "dirty" element. Although discussed as the dirty indicator 250 providing the list of values related to the history of the "dirty" element, the user interface 210, graphical model 220 and/or the graphical modeling environment 210 may be configured to provide such values. One ordinarily skilled in the art will recognize and appreciate how a list of values related to changes to the dirty element, either current or historically, may be provided by a variety of suitable means and/or mechanisms.

In view of the structure, functions and operations of the systems and methods as described herein, the present invention provides techniques for detecting actions to change or alter elements of a user interface and graphical model and provide an indicator that identifies the detection. The indicator provides a visual, auditory and/or tactile cue or prompt to the user that an element of the user interface and/or graphical model may have been changed or at least action was taken to attempt to change it. In this manner, users can efficiently view what elements of multiple element user interfaces and graphical models may have been changed and may need attention to save or cancel the changes.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A computer-implemented method for providing an indicator to indicate a detection of an editing action associated with at least one editable element of the user interface, the method comprising:
displaying the user interface on a display device, where the user interface:
is associated with an executable block diagram model, and
includes one or more editable elements;
implementing the editing action on the at least one editable element among the one or more editable elements of the user interface, where the editing action:
modifies a value of the at least one editable element of the user interface, and
alters an execution of the executable block diagram model;
displaying, on the displayed user interface, the indicator associated with the editing action, the indicator representing existence of a difference between:
the at least one editable element as modified by the editing action and a saved version of the at least one editable element, or
the at least one editable element as modified by the editing action and a version of the at least one editable element where the editing action is applied; and
removing the indicator from the displayed user interface upon saving the at least one editable element as modified by the editing action or upon applying the editing action to the at least one editable element.

2. The method of claim 1, wherein the editing action is performed by an executable instruction or in response to use of an input device.

3. The method of claim 1, wherein the at least one editable element comprises one of a text field, an edit box, a choose list, a combo box, a check list, and a radio button.

4. The method of claim 1, wherein the editing action includes one of entering of a character into the at least one editable element, and selecting of the value of the at least one editable element.

5. The method of claim 1, wherein the indicator includes one of a font color, font type, a font style and a background color that is distinguishable from one of a font color, font type, font style and background color of the at least one editable element.

6. The method of claim 1, wherein the displaying of the indicator includes changing display of at least one of a font color, font type, a font style and a color of the at least one editable element.

7. The method of claim 1, wherein the indicator provides one or more of the following: a highlight, an animation, a symbol, an alphanumeric character, a sound, a force feedback, and a tactile feedback.

8. The method of claim 1, wherein the user interface comprises a graphical user interface or a text-based user interface.

9. A computer-implemented method for providing an indicator to indicate a detection of an action associated with an executable block diagram model, the method comprising:
displaying an executable block diagram model via a user interface on a display device, where the executable block diagram model is editable;
detecting an editing action associated with the executable block diagram model, where the editing action:
adds an element to the executable block diagram model,
removes an element from the executable block diagram model, or
modifies a property of an element in the executable block diagram model;
displaying, on the displayed executable block diagram model, an indicator associated with the editing action, the indicator representing existence of a difference:
between the executable block diagram model as edited and a saved version of the executable block diagram model, or
between the executable block diagram model as edited and a version of the executable block diagram model where the editing action is applied;
removing the indicator from the displayed executable block diagram model upon saving the executable block diagram model as modified by the editing action or upon applying the editing action to the executable block diagram model.

10. The method of claim 9, wherein the editing action is performed by an executable instruction or in response to use of an input device.

11. The method of claim 9, where the element comprises one or more of a block, a line, a parameter, a signal label or an annotation.

12. The method of claim 9, wherein the indicator includes one of a font color, font type, a font style and a background color that is distinguishable from one of a font color, font type, font style and background color of the element.

13. The method of claim 9, wherein the displaying of the indicator includes changing display of at least one of a font color, font type, a font style and a color of the element.

14. The method of claim 9, wherein the indicator provides one or more of the following: a highlight, an animation, a symbol, an alphanumeric character, a sound, a force feedback, and a tactile feedback.

15. A non-transitory computer-readable medium storing computer-readable instructions that when executed on a processor cause the processor to:
display a user interface on a display device, where the user interface:
is associated with an executable block diagram model, and
includes one or more editable elements;
implement an editing action on at least one editable element of the user interface, where the editing action:
modifies a value of the at least one editable element of the user interface, and
alters an execution of the executable block diagram model;
display, on the displayed user interface, an indicator associated with the editing action, the indicator representing existence of a difference between:
the editable element as modified by the editing action and a saved version of the editable element, or
the editable element as modified by the editing action and a version of the editable element where the editing action is applied; and
remove the indicator from the displayed user interface model upon saving the editable element as modified by the editing action or upon applying the editing action to the editable element.

16. The medium of claim 15, wherein the editing action is performed by an executable instruction or in response to use of an input device.

17. The medium of claim 15, wherein the at least one editable element comprises one of a text field, edit box, choose list, combo box, check list, and a radio button.

18. The medium of claim 15, wherein the editing action includes one of entering of a character into the at least one editable element, and selecting of the value of the at least one editable element.

19. The medium of claim 15, wherein the indicator includes one of a font color, font type, a font style and a background color that is distinguishable from one of a font color, font type, font style and background color of the at least one editable element.

20. The medium of claim 15, wherein the displaying of the indicator includes changing display of at least one of a font color, font type, a font style and a color of the at least one editable element.

21. The medium of claim 15, wherein the indicator provides one or more of the following: a highlight, an animation, a symbol, an alphanumeric character, a sound, a force feedback, and a tactile feedback.

22. The medium of claim 15, wherein the user interface comprises a graphical user interface or a text-based user interface.

23. A non-transitory computer-readable medium storing computer-readable instructions that when executed on a processor cause the processor to:
display an executable block diagram model via a user interface on a display device, where the executable block diagram model is editable;
detect an editing action associated with the executable block diagram model, where the editing action:
adds an element to the executable block diagram model,
removes an element from the executable block diagram model, or
modifies a property of an element in the executable block diagram model;
display, on the displayed executable block diagram model, an indicator associated with the editing action, the indicator representing existence of a difference:
between the executable block diagram model as edited and a saved version of the executable block diagram model, or
between the executable block diagram model as edited and a version of the executable block diagram model where the editing action is applied; and
remove the indicator from the displayed executable block diagram model upon saving the executable block diagram model as modified by the editing action or upon applying the editing action to the executable block diagram model.

24. The medium of claim 23, wherein the editing action is performed by an executable instruction or in response to use of an input device.

25. The medium of claim 23, where the element comprises one or more of a block, a line, a parameter, a signal label or an annotation.

26. The medium of claim 23, wherein the indicator includes one of a font color, font type, a font style and a background color that is distinguishable from one of a font color, font type, font style and background color of the element.

27. The medium of claim 23, wherein the displaying of the indicator includes changing display of at least one of a font color, font type, a font style and a color of the element.

28. The medium of claim 23, wherein the indicator provides one or more of the following: a highlight, an animation, a symbol, an alphanumeric character, a sound, a force feedback, and a tactile feedback.

29. A system for providing an indicator to indicate a detection of an editing action associated with an editable element of a user interface, the system comprising:
a display device for displaying a user interface associated with an executable block diagram model, the user interface including one or more editable elements; and
a processor executing instructions for:
implementing an editing action on at least one editable element of the user interface, where the editing action:
modifies a value of the at least one editable element of the user interface, and
alters an execution of the executable block diagram model;
displaying, on the displayed user interface, an indicator associated with the editing action, the indicator representing existence of a difference between:
the editable element as modified by the editing action and a saved version of the editable element, or
the editable element as modified by the editing action and a version of the editable element where the editing action is applied; and
removing the indicator from the displayed user interface model upon saving the editable element as modified by the editing action or upon applying the editing action to the editable element.

30. A system for providing an indicator to indicate a detection of an action associated with an executable block diagram model, the system comprising:
a display device for displaying an executable block diagram model via a user interface, where the executable block diagram model is editable; and
a processor executing instructions for:
detecting an editing action associated with the executable block diagram model, where the editing action:
adds an element to the executable block diagram model,
removes an element from the executable block diagram model, or
modifies a property of an element in the executable block diagram model,
displaying, on the displayed executable block diagram model, an indicator associated with the editing action, the indicator representing existence of a difference:
between the executable block diagram model as edited and a saved version of the executable block diagram model, or
between the executable block diagram model as edited and a version of the executable block diagram model where the editing action is applied, and
removing the indicator from the displayed executable block diagram model upon saving the executable block diagram model as modified by the editing action or upon applying the editing action to the executable block diagram model.

* * * * *

UNITED STATES PATENT AND TRADEMARK OFFICE
CERTIFICATE OF CORRECTION

Page 1 of 3

PATENT NO.       : 8,661,344 B1
APPLICATION NO.  : 13/351990
DATED            : February 25, 2014
INVENTOR(S)      : Jay Ryan Torgerson It is certified that error appears in the above-identified patent and that said Letters Patent is hereby corrected as shown below:

In The Specification

Column 4, line 3, after "to" delete "on"
Column 4, line 56, after "The" (first occurrence) insert --at --
Column 8, line 27, after "device" delete "118" and insert --102--
Column 9, line 57, after "environment" delete "210" and insert --120--
Column 10, line 2, after "environment" delete "210" and insert --120--
Column 12, line 19, after "model" delete "210" and insert --220--
Column 12, line 50, after "environment" delete "210" and insert --120--
Column 12, line 52, after "environment" delete "210" and insert --120--
Column 13, line 34/35, after "environment" delete "210" and insert --120--
Column 14, line 44, after "network" delete "140" and insert --204--
Column 15, line 32, after "network" delete "225" and insert --204--
Column 15, line 67, after "interface" delete "305"
Column 16, line 60, after "field" delete "210" and insert --410--
Column 18, line 34, after "interface" delete "215" and insert --210--
Column 18, line 35, after "interface" delete "215" and insert --210--
Column 19, line 14, after "the" delete "dirt" and insert --dirty--
Column 20, line 38, after "widget" delete "405" and insert --402--
Column 21, line 54, after "may" insert --be--
Column 25, line 31, after "means" delete "provides" and insert --provided--
Column 28, line 2, after "indicator" delete "25" and insert --250--
Column 28, line 38, after "environment" delete "210" and insert --120--

In The Claims

Column 29, line 33 (claim 2, line 2) after "to" insert --a--
Column 29, line 43 (claim 5, line 2) after "color," insert --a--
Column 29, line 44 (claim 5, line 3) after "color," insert --a--

Signed and Sealed this
Thirtieth Day of December, 2014

Michelle K. Lee
*Deputy Director of the United States Patent and Trademark Office*

CERTIFICATE OF CORRECTION (continued)
U.S. Pat. No. 8,661,344 B1

Column 29, line 45 (claim 5, line 4) after "type," insert --a-- and after "and" insert --a--
Column 29, line 48 (claim 6, line 2) after "changing" insert --a--
Column 29, line 49 (claim 6, line 3) after "color," insert --a--
Column 29, line 58 (claim 9, line 2) after "an" (first occurrence), insert --editing--
Column 29, line 60 (claim 9, line 4) after "displaying" delete "an" and insert --the--
Column 29, line 63 (claim 9, line 7) after "detecting" delete "an" and insert --the--
Column 30, line 4 (claim 9, line 15) after "model," delete "an" and insert --the--
Column 30, line 11 (claim 9, line 22) after "applied;" insert --and--
Column 30, line 19 (claim 10, line 2) after "to" insert --a--
Column 30, line 25 (claim 12, line 2) after "color," insert --a--
Column 30, line 26 (claim 12, line 3) after "color," insert --a--
Column 30, line 27 (claim 12, line 4) after "type," insert --a-- and after "and" insert --a--
Column 30, line 29 (claim 13, line 2) after "changing" insert --a--
Column 30, line 30 (claim 13, line 3) after "color," insert --a--
Column 30, line 44/45 (claim 15, line 10) after "element" insert --among the one or more editable elements--
Column 30, line 53 (claim 15, line 18) after "the" (first occurrence) insert --at least one--
Column 30, line 54 (claim 15, line 19) after "the" insert --at least one--
Column 30, line 55 (claim 15, line 20) after "the" (first occurrence) insert --at least one--
Column 30, line 56 (claim 15, line 21) after "the" (first occurrence) insert --at least one--
Column 30, line 59 (claim 15, line 24) delete "model" and after "the" insert --at least one--
Column 30, line 61 (claim 15, line 26) after "the" insert --at least one--
Column 30, line 63 (claim 16, line 2) after "to" insert --a--
Column 30, line 66 (claim 17, line 2) after "field," insert --a--
Column 30, line 67 (claim 17, line 3) delete "choose list, combo box," and insert --a choose list, a combo box, a--
Column 31, line 6 (claim 19, line 2) after "color," insert --a--
Column 31, line 8 (claim 19, line 4) delete "font, font style and" and insert --a font, a font style and a--
Column 31, line 11 (claim 20, line 2) after "changing" insert --a--
Column 31, line 12 (claim 20, line 3) after "color," insert --a--
Column 31, line 49 (claim 24, line 2) after "to" insert --a--
Column 31, line 55 (claim 26, line 2) after "color," insert --a--
Column 31, line 57 (claim 26, line 4) delete "font type, font style and" and insert --a font type, a font style and a--
Column 31, line 60 (claim 27, line 2) after "changing" insert --a--
Column 31, line 61 (claim 27, line 3) after "color," insert --a--
Column 32, line 6 (claim 29, line 2) after "with" delete "an" and insert --at lease one--
Column 32, line 8 (claim 29, line 4) after "displaying" delete "a" and insert --the--
Column 32, line 12 (claim 29, line 8) after "implementing" delete "an" and insert --the-- and after "on" insert --the--
Column 32, line 13 (claim 29, line 9) after "element" to insert --among the one or more editable elements--
Column 32, line 19 (claim 29, line 14) after "interface" delete "an" and insert --the--
Column 32, line 21 (claim 29, line 16) after "resenting" insert --an--

CERTIFICATE OF CORRECTION (continued)
U.S. Pat. No. 8,661,344 B1

Column 32, line 22 (claim 29, line 17) after "the" (first occurrence) insert --at least one--
Column 32, line 23 (claim 29, line 18) after "the" insert --at least one--
Column 32, line 24 (claim 29, line 19) after "the" (first occurrence) insert --at least one--
Column 32, line 25 (claim 29, line 20) after "the" (first occurrence) insert --at least one--
Column 32, line 28 (claim 29, line 23) delete "model" and after "the" insert --at least one--
Column 32, line 30 (claim 29, line 25) after "the" insert --at least one--
Column 32, line 32 (claim 30, line 2) after "an" (first occurrence) insert --editing--
Column 32, line 34 (claim 30, line 4) after "displaying" delete "an" and insert --the--
Column 32, line 48 (claim 30, line 17) after "model," delete "an" and insert --the--
Column 32, line 49 (claim 30, line 18) after "representing" insert --an--